(12) United States Patent  (10) Patent No.: US 9,118,812 B2
Beyda et al.  (45) Date of Patent: Aug. 25, 2015

(54) AUDIENCE SERVER

(75) Inventors: Gil Beyda, Dresher, PA (US); Joseph G. Wilson, Fairfax, VA (US)

(73) Assignee: ADVERTISING.COM LLC, Dulles, VA (US)

(*) Notice: Subject to any disclaimer, the term of this patent is extended or adjusted under 35 U.S.C. 154(b) by 1786 days.

(21) Appl. No.: 11/132,429

(22) Filed: May 19, 2005

(65) Prior Publication Data

US 2005/0246736 A1  Nov. 3, 2005

Related U.S. Application Data

(63) Continuation-in-part of application No. 11/014,235, filed on Dec. 17, 2004, now Pat. No. 8,464,290, which is a continuation-in-part of application No. 10/981,733, filed on Nov. 5, 2004, now Pat. No. 8,150,732, which is a continuation-in-part of application No. 10/669,791, filed on Sep. 25, 2003, now Pat. No. 7,805,332.

(60) Provisional application No. 60/491,521, filed on Aug. 1, 2003.

(51) Int. Cl.
| | |
|---|---|
| H04N 7/10 | (2006.01) |
| H04N 7/173 | (2011.01) |
| H04H 60/45 | (2008.01) |
| H04H 60/46 | (2008.01) |
| H04N 21/2547 | (2011.01) |
| H04N 21/258 | (2011.01) |
| H04N 21/442 | (2011.01) |
| H04N 21/658 | (2011.01) |
| H04N 21/81 | (2011.01) |

(Continued)

(52) U.S. Cl.
CPC ............. *H04N 7/173* (2013.01); *H04H 60/45* (2013.01); *H04H 60/46* (2013.01); *H04N 7/17318* (2013.01); *H04N 21/2547* (2013.01); *H04N 21/25891* (2013.01); *H04N 21/44222* (2013.01); *H04N 21/6581* (2013.01); *H04N 21/6582* (2013.01); *H04N 21/812* (2013.01); *H04H 20/14* (2013.01); *H04H 60/66* (2013.01); *H04H 2201/70* (2013.01)

(58) Field of Classification Search
USPC ......................................... 725/46, 14, 34, 35
See application file for complete search history.

(56) References Cited

U.S. PATENT DOCUMENTS

| 5,675,510 A | 10/1997 | Coffee et al. |
| 5,796,952 A | 8/1998 | Davis et al. |

(Continued)

FOREIGN PATENT DOCUMENTS

| JP | 2001175761 A | 6/2001 |
| JP | 2002092284 | 3/2002 |

(Continued)

*Primary Examiner* — Jivka Rabovianski
(74) *Attorney, Agent, or Firm* — Bookoff McAndrews, PLLC

(57) ABSTRACT

Delivery of content such as advertisements to audience members. Profile data is collected regarding audience members to whom advertisements may be delivered, such that a given audience member has an established profile data. Upon receiving a request to serve an advertisement to an audience member, a recognition that the target of the request is the given audience member is made. Then it is determined that a particular advertisement should be served to the given audience member. The determination includes recognition of the given audience member and corresponding selection advertisements optimized for the recognized audience member. A configurable delivery decision making mode allows pre-optimized as well as delivery time factoring for determining advertisements. Performance criteria and revenue allocation based upon data provider participation are also provided.

16 Claims, 26 Drawing Sheets

(51) Int. Cl.
  *H04H 20/14* (2008.01)
  *H04H 60/66* (2008.01)

(56) References Cited

U.S. PATENT DOCUMENTS

| | | | |
|---|---|---|---|
| 5,948,061 A | | 9/1999 | Merriman et al. |
| 6,044,376 A | * | 3/2000 | Kurtzman, II ............... 1/1 |
| 6,078,866 A | | 6/2000 | Buck et al. |
| 6,108,637 A | | 8/2000 | Blumenau |
| 6,108,645 A | | 8/2000 | Eichstaedt et al. |
| 6,115,680 A | | 9/2000 | Coffee et al. |
| 6,138,115 A | | 10/2000 | Agrawal et al. |
| 6,144,944 A | * | 11/2000 | Kurtzman et al. ........ 705/14.54 |
| 6,154,783 A | | 11/2000 | Gilmour et al. |
| 6,237,033 B1 | | 5/2001 | Doeberl et al. |
| 6,269,361 B1 | | 7/2001 | Davis et al. |
| 6,324,519 B1 | | 11/2001 | Eldering |
| 6,385,619 B1 | | 5/2002 | Eichstaedt et al. |
| 6,477,575 B1 | | 11/2002 | Koeppel et al. |
| 6,487,390 B1 | | 11/2002 | Virine et al. |
| 6,526,406 B1 | | 2/2003 | Suzuki et al. |
| 6,560,578 B2 | | 5/2003 | Eldering |
| 6,563,514 B1 | | 5/2003 | Samar |
| 6,604,138 B1 | | 8/2003 | Virine et al. |
| 6,606,745 B2 | | 8/2003 | Maggio |
| 6,611,839 B1 | | 8/2003 | Nwabueze |
| 6,611,842 B1 | | 8/2003 | Brown |
| 6,643,635 B2 | | 11/2003 | Nwabueze |
| 6,643,696 B2 | | 11/2003 | Davis et al. |
| 6,665,837 B1 | | 12/2003 | Dean et al. |
| 6,698,020 B1 | | 2/2004 | Zigmond et al. |
| 6,704,727 B1 | | 3/2004 | Kravets |
| 6,708,203 B1 | | 3/2004 | Makar et al. |
| 6,714,917 B1 | | 3/2004 | Eldering et al. |
| 6,757,682 B1 | | 6/2004 | Naimark et al. |
| 6,763,334 B1 | | 7/2004 | Matsumoto et al. |
| 6,763,386 B2 | | 7/2004 | Davis et al. |
| 6,778,975 B1 | | 8/2004 | Anick et al. |
| 6,785,666 B1 | | 8/2004 | Nareddy et al. |
| 6,785,704 B1 | | 8/2004 | McCanne |
| 6,807,558 B1 | | 10/2004 | Hassett et al. |
| 6,871,196 B1 | | 3/2005 | Chan et al. |
| 6,873,981 B2 | | 3/2005 | Nareddy et al. |
| 6,917,972 B1 | | 7/2005 | Basko et al. |
| 6,993,529 B1 | | 1/2006 | Basko et al. |
| 2001/0039515 A1 | * | 11/2001 | Mayadas ................ 705/14 |
| 2001/0042064 A1 | | 11/2001 | Davis et al. |
| 2001/0047354 A1 | | 11/2001 | Davis et al. |
| 2001/0051940 A1 | | 12/2001 | Soulanille |
| 2002/0002445 A1 | | 1/2002 | Doliov |
| 2002/0010757 A1 | * | 1/2002 | Granik et al. ............. 709/218 |
| 2002/0053078 A1 | * | 5/2002 | Holtz et al. ............... 725/14 |
| 2002/0165849 A1 | | 11/2002 | Singh et al. |
| 2002/0169760 A1 | | 11/2002 | Cheung et al. |
| 2003/0028529 A1 | | 2/2003 | Cheung et al. |
| 2003/0033292 A1 | | 2/2003 | Meisel et al. |
| 2003/0055816 A1 | | 3/2003 | Paine et al. |
| 2003/0093285 A1 | | 5/2003 | Colace et al. |
| 2003/0149937 A1 | | 8/2003 | McElfresh et al. |
| 2003/0208474 A1 | | 11/2003 | Soulanille et al. |
| 2003/0212648 A1 | | 11/2003 | Cunningham et al. |
| 2003/0220912 A1 | | 11/2003 | Fain et al. |
| 2004/0039733 A1 | | 2/2004 | Soulanille |
| 2004/0054661 A1 | | 3/2004 | Cheung et al. |
| 2004/0073538 A1 | | 4/2004 | Leishman et al. |

FOREIGN PATENT DOCUMENTS

| | | |
|---|---|---|
| JP | 2006522011 | 9/2006 |
| WO | WO 01/54034 A1 | 7/2001 |
| WO | WO0190956 | 11/2001 |
| WO | WO 02/13112 A | 2/2002 |
| WO | WO02065331 | 8/2002 |
| WO | WO 02/102030 A2 | 12/2002 |
| WO | WO2005013072 A2 | 2/2005 |

* cited by examiner

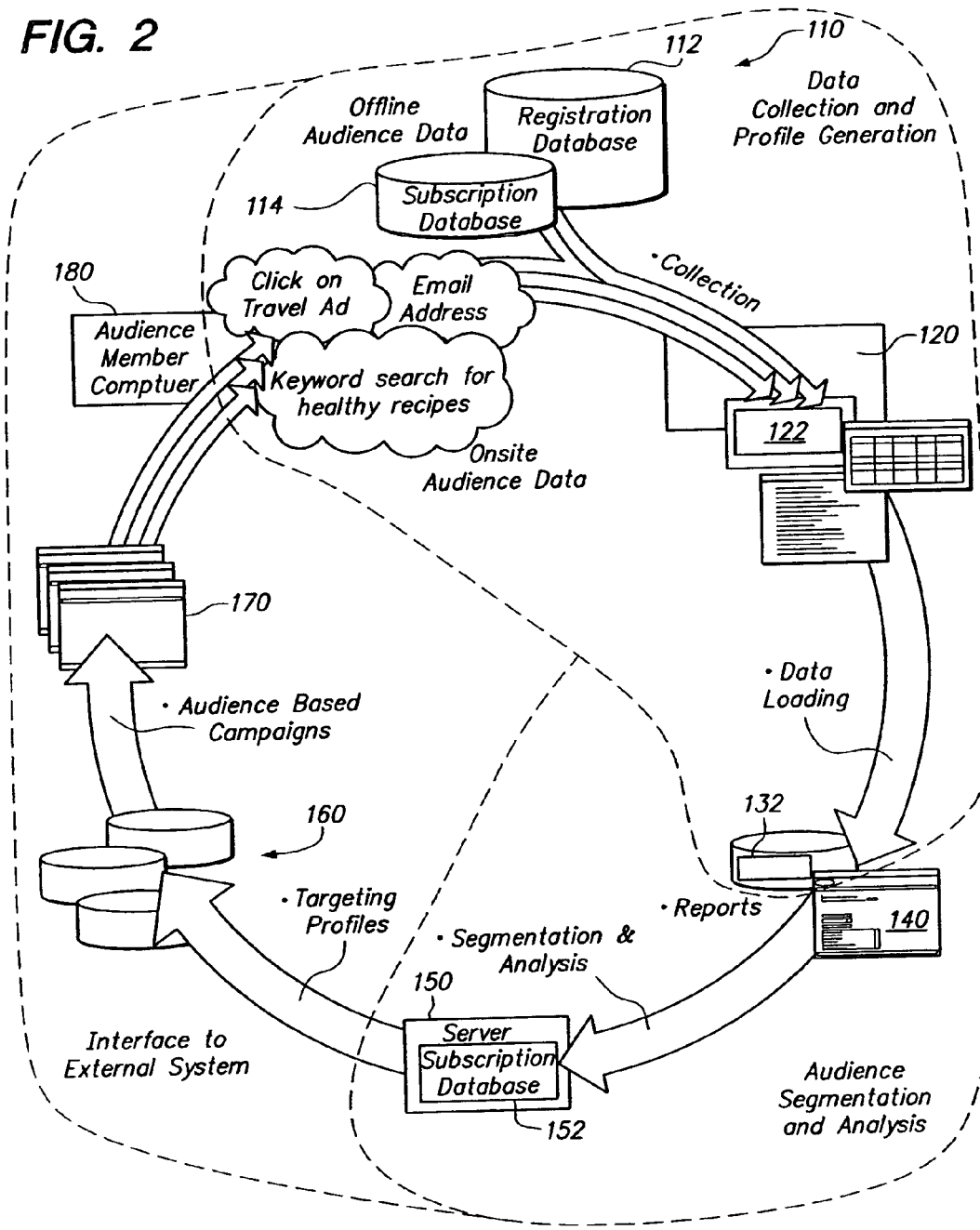

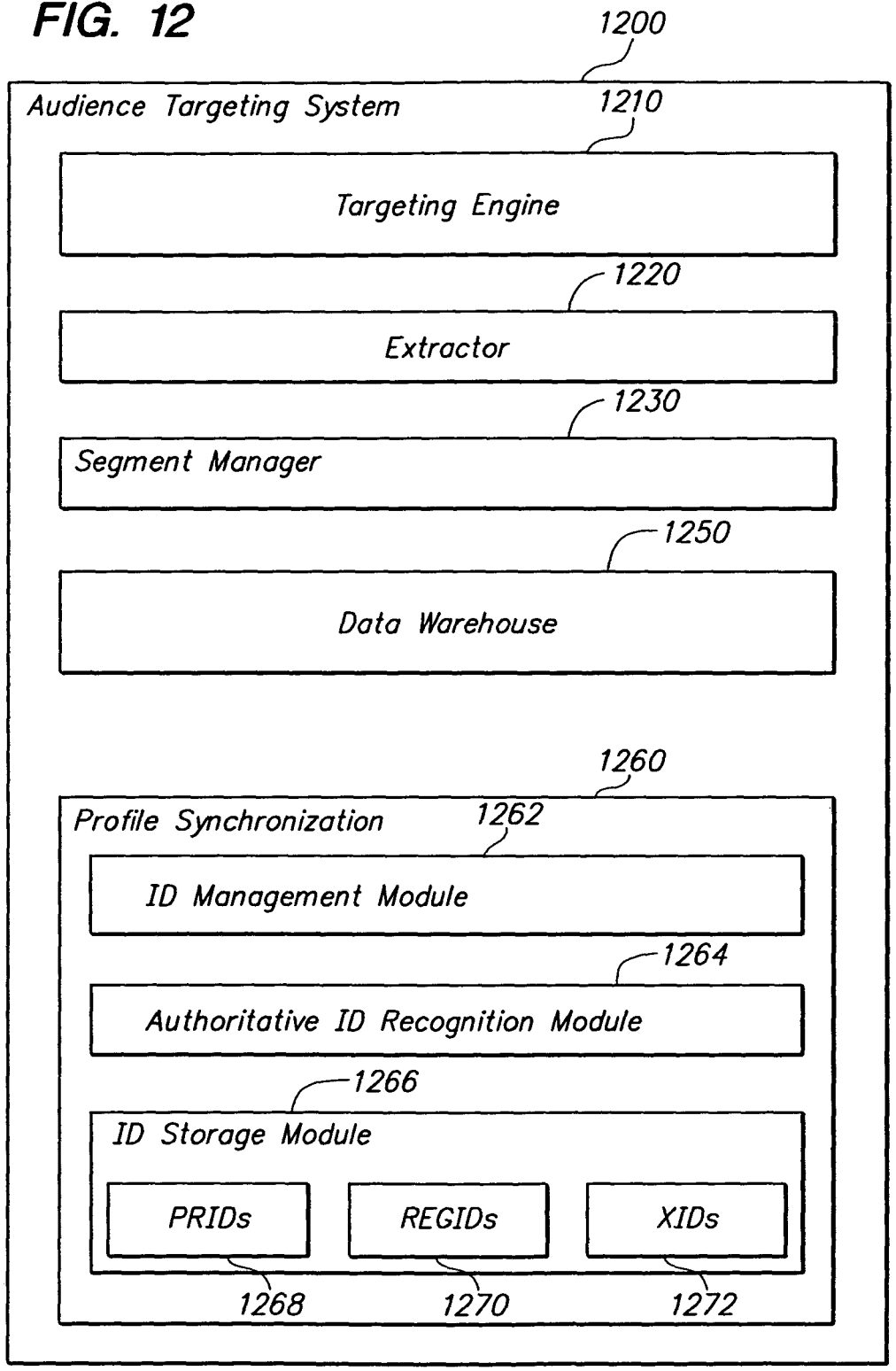

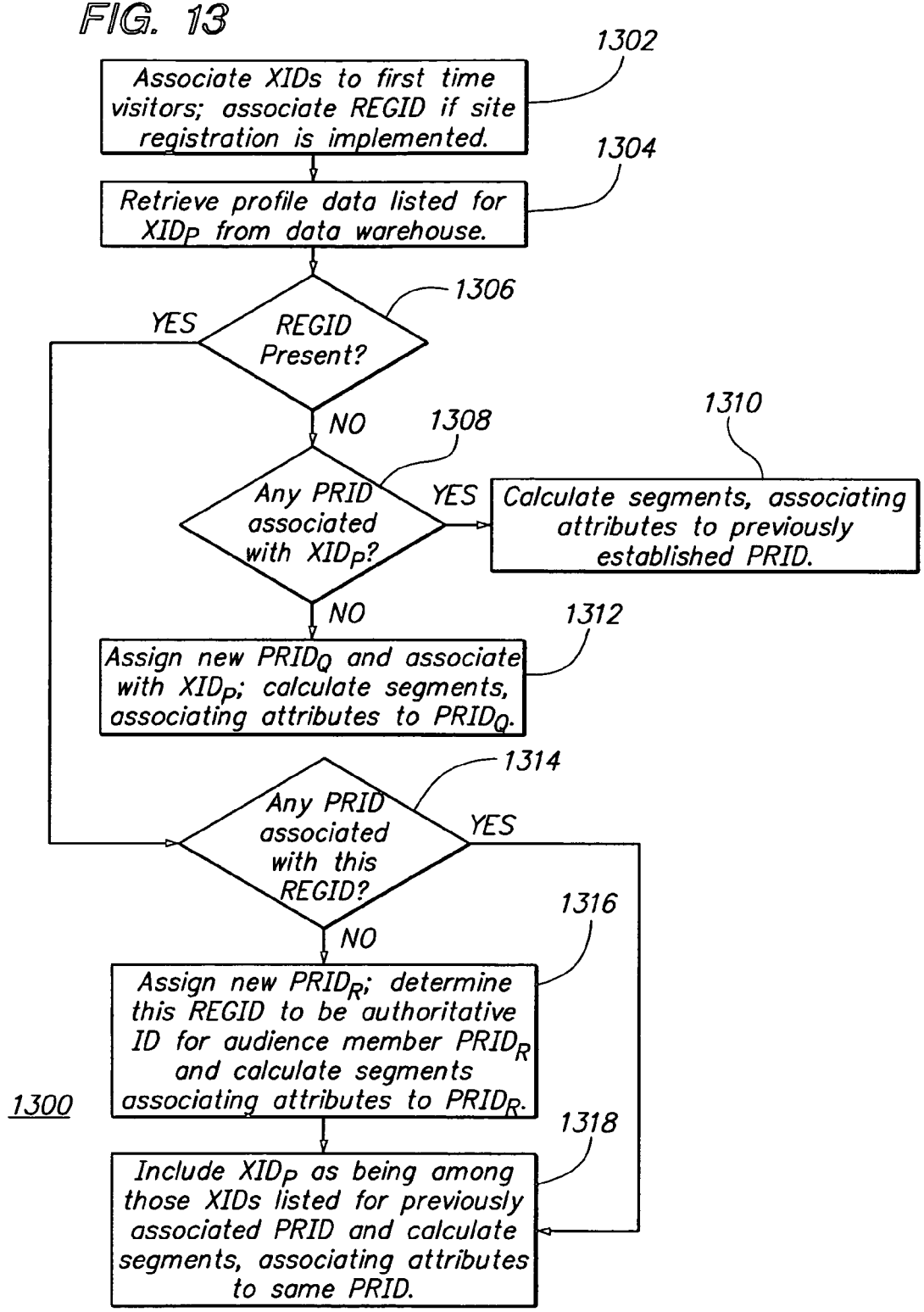

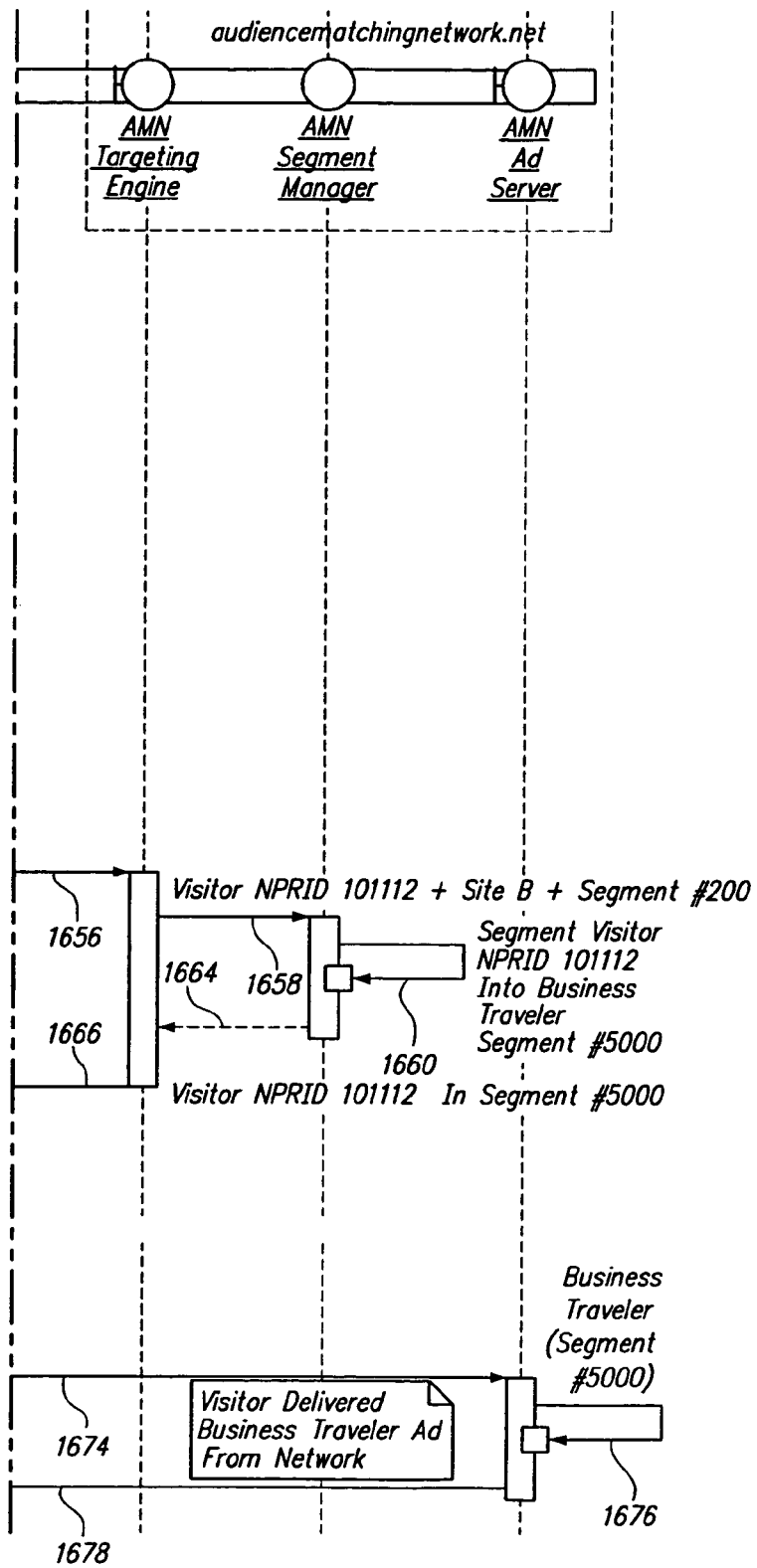
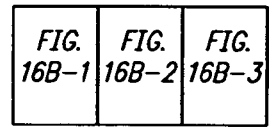
FIG. 16B-3
FIG. 16B

AUDIENCE SERVER

CROSS REFERENCE TO RELATED APPLICATIONS

This application is a continuation-in-part of U.S. patent application Ser. No. 11/014,235 filed on Dec. 17, 2004 now U.S. Pat. No. 8,464,290, and entitled "Network for Matching an Audience with Deliverable Content," which is a continuation-in-part of U.S. patent application Ser. No. 10/981,733 filed on Nov. 5, 2004 now U.S. Pat. No. 8,150,732, and entitled "Audience Targeting System with Segment Management," which is a continuation-in-part of U.S. patent application Ser. No. 10/669,791, filed on Sep. 25, 2003 now U.S. Pat. No. 7,805,332, and entitled "System and Method for Segmenting and Targeting Audience Members," which claims the benefit under 35 USC §119 of Provisional Patent Application No. 60/491,521, filed on Aug. 1, 2003. The entire contents of these Applications are hereby incorporated by reference.

BACKGROUND OF THE INVENTION

1. Field of the Invention

This invention relates generally to audience targeting and more particularly to an audience server for matching deliverable content such as advertising to an audience.

2. Description of the Related Art

Targeted marketing has long been known as an effective method for reaching consumers. When the consumer receives only relevant content (advertisements, etc.) from a provider, the consumer is more likely to patronize the particular provider, make purchases, and provide additional personal information that may assist in refining the provider's "view" of the consumer. As such, targeted marketing can lead to a more focused and robust interaction with the consumer. This, correspondingly, can lead to a more rewarding interaction for the provider by generating increased revenue.

In order to effectively target a consumer, it may be desirable for marketing systems to react to consumer information received from a variety of online and offline sources. These sources may include databases and servers, as well as multiple web properties within a network of affiliated websites. Moreover, the consumer information may be collected from a variety of sources in diverse formats. It may also be desirable for marketing systems to interact with the systems that actually deliver the content to the user. In short, an effective marketing system may appreciate the characteristics and preferences of a specific user regardless of the number or type of channels through which contact with the user is made.

Some known systems, however, are only adapted to receive information from a single source (e.g., registration information provided by the consumer). Other systems may receive information from multiple sources, but are unable to usefully combine information relating to the same consumer and communicate it to the necessary content delivery system. Thus, it may be desirable to have a system and method for delivering content that integrates with and aggregates data from various sources, including the underlying systems that deliver content to the consumer.

Known systems for delivering targeted content to consumers are focused on reaching the greatest quantity of consumers, without considering the value of interacting with each particular consumer. For example, some systems may deliver "targeted" content to each member of a group of consumers based on the fact that each subscribes to the same magazine. These systems, however, do not consider that only a portion of the group may make on-line purchases, for example, in addition to subscribing to the magazine. This failure to recognize and differentiate "valuable" consumers can lead to lost revenue for the content provider. In addition, the delivery of content to a significant volume of low-value consumers may expend valuable system resources. Accordingly, it may be desirable to have a means of delivering the appropriate content to the appropriate user in order to maximize the value of the relationship between the provider and the consumer.

Another problem with content delivery systems is that the information upon which targeting is based may rapidly become stale. An audience member deemed to have particular characteristics may no longer have such characteristics by the time content is delivered. New potential audience members may also become available after determination of a targeted group. The volatility of audience member characteristics and the high volume of information to be processed both present difficulties to systems that seek to target well tailored audiences. Content delivery systems are also often myopic, merely carrying out content delivery as dictated by the particular domain in which the system resides. This prevents appreciation of activities in other domains.

Still another problem with content delivery systems, particularly advertisement delivery systems, is that they are unduly contextual and reactive. The context of ad placement in a web page is not always indicative of the advertisement that is most appropriate for a requestor. For example, a requestor of a weather page is not necessarily interested in travel and golf advertisements, but may nevertheless be delivered such ads any time they request such a page. Additionally, reactive ad placement systems respond to a request for an advertisement, typically in reaction to information that is provided with the request. There may be information that is contained in connection with the current browsing activities of the user corresponding to the request. The solely reactive approach is by nature contextual, and is in other ways tied to the request itself. Accordingly, the decision as to which advertisement is most appropriate for the user ignores the individual characteristics of the user/requestor, and merely looks at information in the request.

It is also difficult for publishers to serve advertisements such that revenue is maximized, or accommodate proper serving of advertisements by third party providers. Finally, the allocation of credit and corresponding revenue for activities related to the serving of advertisements remains inadequate.

SUMMARY OF THE INVENTION

The present invention accommodates improved delivery of content such as advertisements to audience members, such as through a computer network.

In one aspect, profile data is collected regarding each of a plurality of audience members to whom advertisements may be delivered. Thus, a given audience member has an established profile data. Upon receiving a request to serve an advertisement to an audience member, a recognition that the target of the request is the given audience member is made. Then it is determined that a particular advertisement should be served to the given audience member. This determination is based upon the recognition of the given audience member, as well as a selection that is made from a set of advertisements that is optimized for the given audience member.

The optimized set of advertisements is based upon the established profile data for the given audience member, such that an appropriate selection may be made outside the context of the request. In this fashion, this aspect of the present invention accommodates delivery of advertisements that is not purely based upon the context of a page request or the like, but rather is primarily based upon recognition of the particular audience member and appreciation of the data profile that had already been established for the particular audience member.

According to another aspect, the present invention provides a configurable delivery decision making mode. For example, a "pre-optimized" factoring option prompts determining the advertisement to be served to the given audience member in dependence upon the established profile data, to accommodate full separation from the context of the request. However, a "delivery time" factoring option supplements determining the particular advertisement with consideration of the context of the request.

According to still another aspect, the present invention accommodates determining the particular advertisement based upon performance criteria configured to benefit a publisher of content in which the advertisement is placed. Such performance criteria may include maximizing revenue to the publisher.

According to still another aspect, the present invention accommodates allocating revenue corresponding to delivery of the advertisement based upon participation as a data provider in the collection of information used to generate the established profile data for the given audience member.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIG. 12 is a block diagram illustrating an example of an audience targeting system that includes profile synchronization.

FIG. 13 is a flow diagram illustrating an example of a process for profile synchronization.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
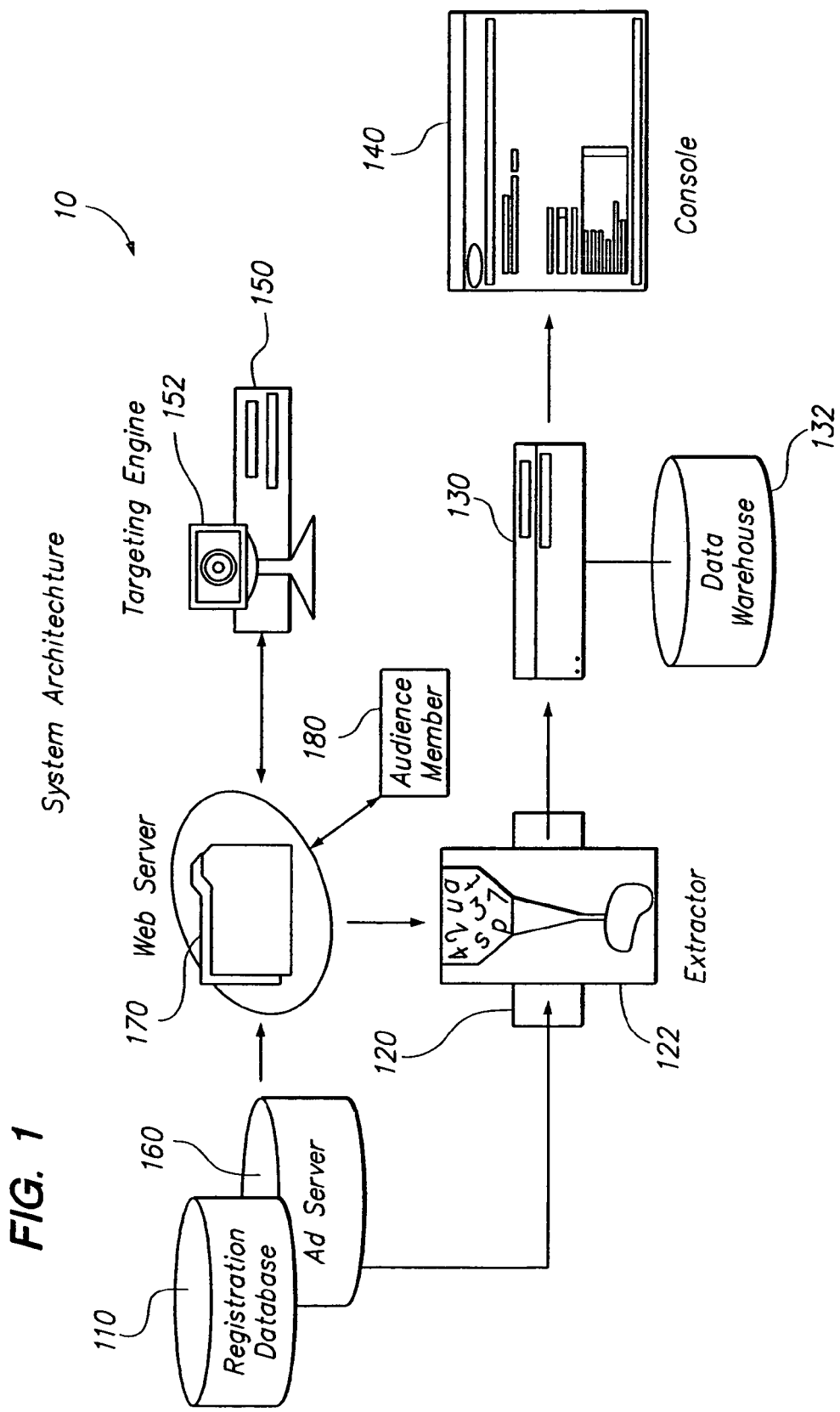
FIG. 1 is a block diagram illustrating an example of a system for delivering content to an audience member.

One embodiment of the system 10 for delivering content to an audience member is shown in FIG. 1. The system 10 includes a first server 120 which hosts an extractor program 122. The first server 120 is operatively connected to one or more offline databases 110, and one or more external content servers 160. The offline databases 110 and external content servers 160 are also operatively connected to one or more web servers 170. The web servers 170 may provide website pages to an audience member computer 180 in a conventional manner. The web servers 170 are also operatively connected to a targeting engine program 152 resident on a second server 150. The first and second servers 120 and 150 may be operatively connected to a third server 130 which contains a database 132 (referred to as the data warehouse) for storing audience member profile data. In some embodiments of the present invention, the same server may act as the first, second, and/or third servers 120, 150, and 130. A control console 140 may be operatively connected to the third server 130.

Figures 1, 16A:
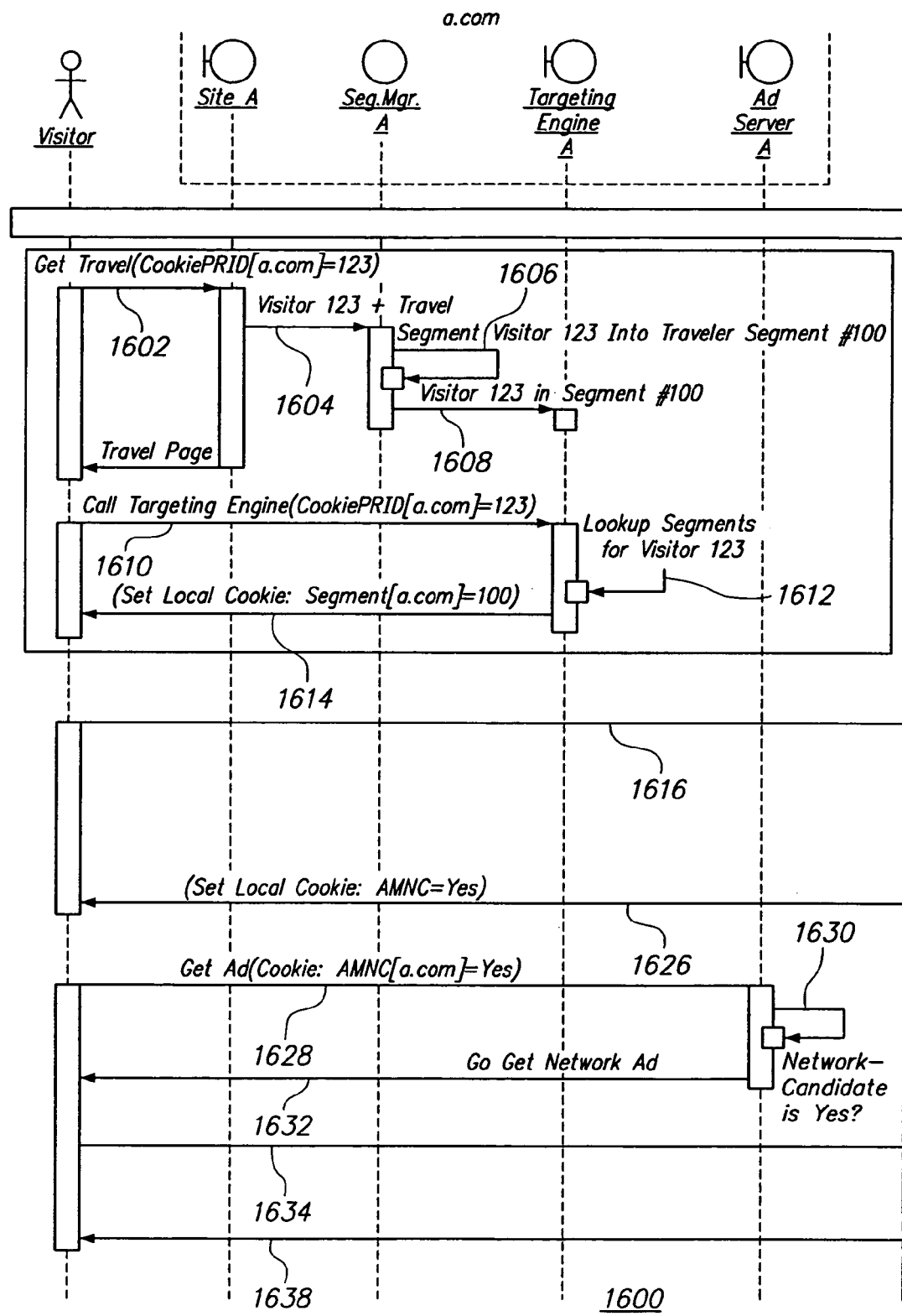
FIGS. 16A-B are event diagrams illustrating an example of a computer implemented process for matching audience members to deliverable content.
Figures 2, 16A:
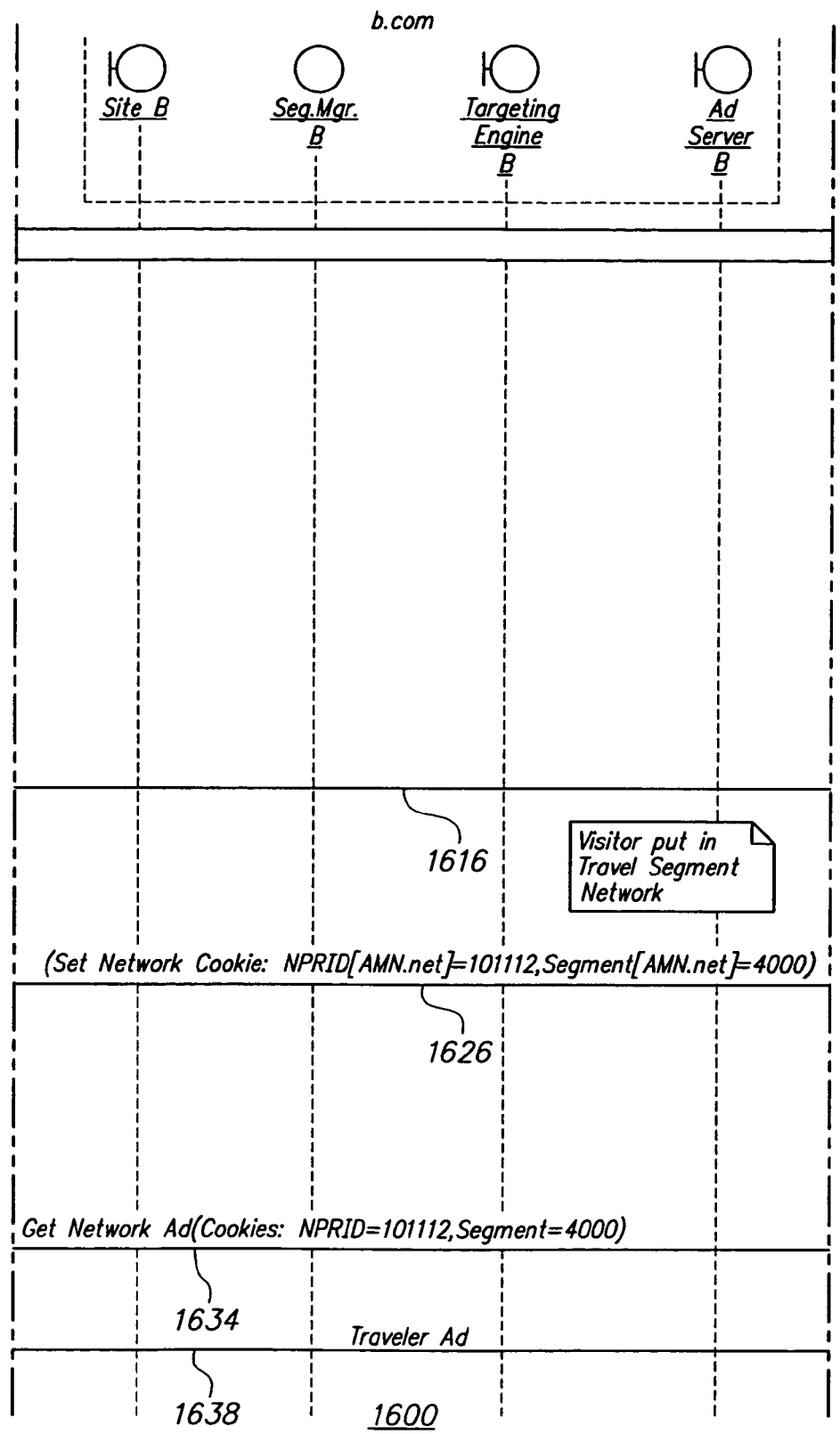
FIG. 2 is a flow diagram illustrating an example of delivering content to an audience member.
Figures 3, 16A:
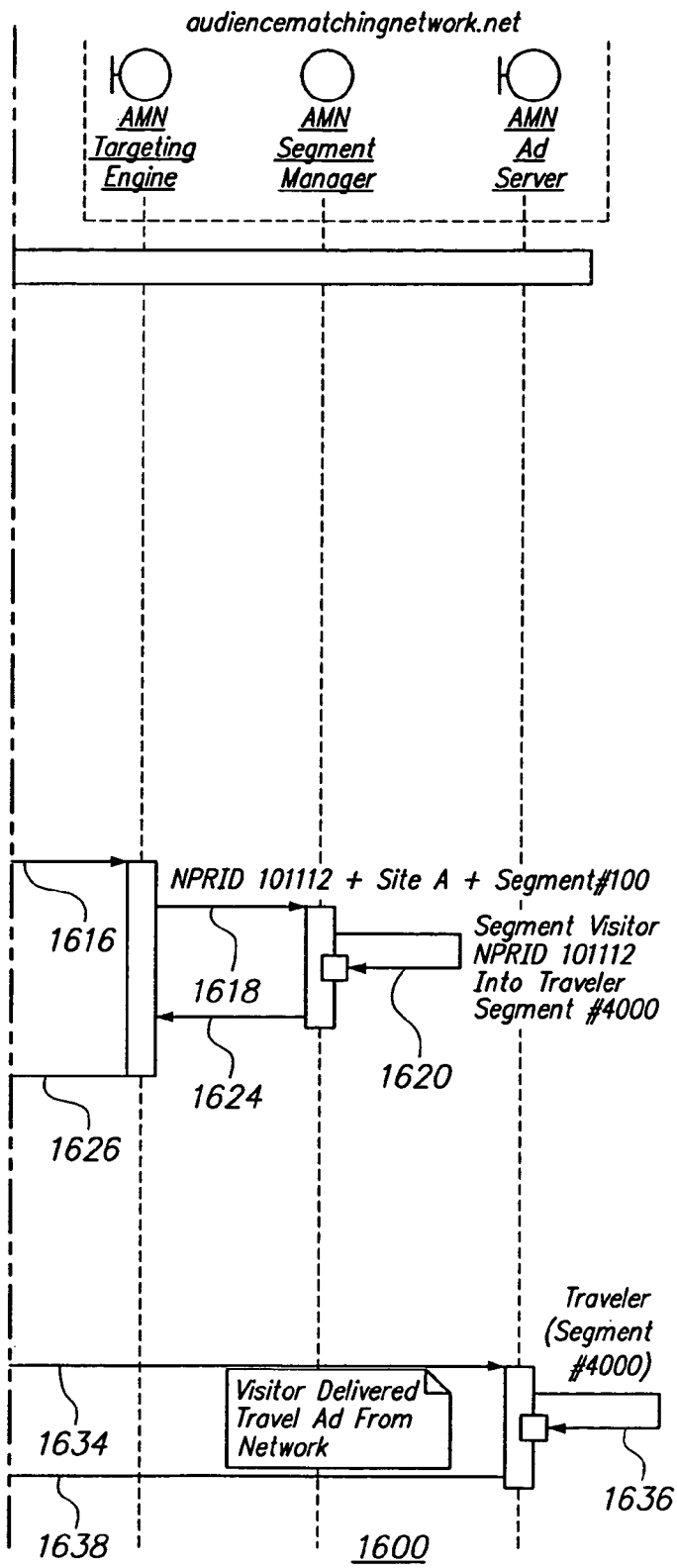
Figure 16A:
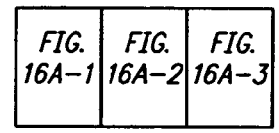

FIG. 2 is a flow diagram illustrating an example of delivering content to an audience member. This may include three primary stages: data collection and profile generation; audience segmentation and analysis; and interface to external systems. During data collection and profile generation, offline data sources 110 are searched to collect profile data relating to individuals (referred to as audience members). This profile data is stored in the data warehouse 132. During audience segmentation and analysis, the profile data for audience members is used to categorize the audience members into segments. For example, profile data may indicate that a particular audience member subscribes to Golf Magazine, and thus has some interest in golf. That audience member may then be included in a segment (i.e., group) of audience members that are also interested in golf. During the interface to external systems stage, a targeting engine 152 may use the inclusion of the audience member in a segment to direct targeted external content to the audience members in that segment. Continuing with the example posed above, audience members in the "golf" segment may have golf related content sent to them as a result.

With continued reference to FIG. 2, data collection and profile generation may involve the offline databases 110, the extractor program 122, and the data warehouse 132. Initial profile information about individual audience members may be collected from available databases, such as a registration database 112 and a subscription database 114 by the extractor 122. Registration and subscription databases 112 and 114 may include audience member profile data collected as a result of the audience member registering with, or subscribing to, any type of service, including but not limited to an Internet, magazine, newspaper, newsletter, cable, telephone, or wireless service, for example. These registration and subscription databases may include a wide variety of profile information such as name, gender, age, birth date, home and work addresses, telephone numbers, credit and charge card information, marital status, income level, number and age of children, employment history, hobbies, recent purchases, educational status, interests, preferences, and the like, for example.

The extractor 122 is a program that is used to parse and identify audience member profile data from within a set of data. The extractor 122 may be constructed using Java, Perl, C++, C#, SQL, or any other similar programming language. The extractor 122 may be resident on a server 120, or multiple servers. The extractor 122 may be governed by a set of extraction rules that determine the source(s) and format(s) of profile data that may be used to create a profile for an audience member, and the categories of profile data to be collected. The extraction rules may include a series of text rules (using matching utilities such as string matching or regular expressions) that are used to transform data in one form into a more standardized form while removing unneeded data. The extraction rules may include, for example, a statement such as "if string contains 'A' then output result 'B'."

The extractor 122 is operatively connected to a database 132 referred to as the data warehouse 132. The data warehouse 132 may be provided on a second server 130, and may be used to store the profile and segment affinity data relating to audience members. The extractor 122 may routinely update the profile and segment affinity data in the data warehouse 132. As new or modified profile data becomes available from the offline databases 110, the extractor 122 may modify the profile data for an audience member. The extractor 122 may also receive profile data directly from the audience member computer 180 and/or the targeting engine 152 that indicates the website pages visited, the web searches conducted, and the emails received by the audience member.

Figure 3:
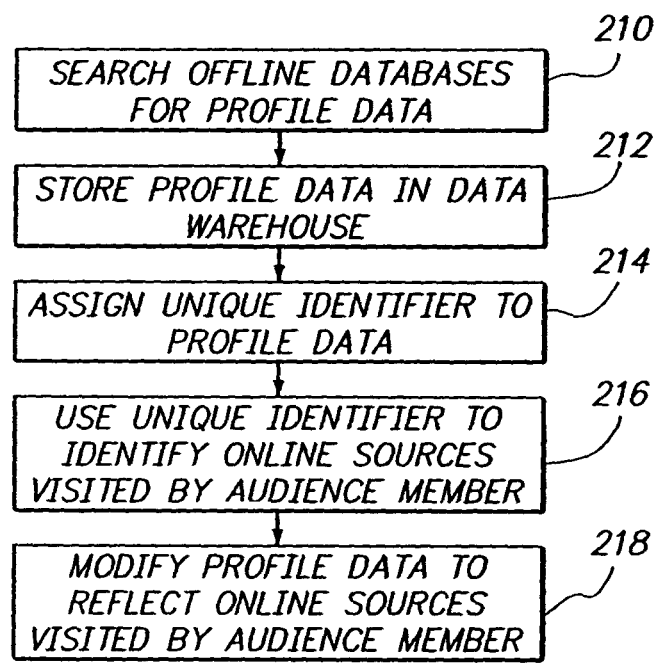
FIG. 3 is a flow diagram illustrating an example of generating audience member profiles.

FIG. 3 is a flow diagram illustrating an example of generating audience member profiles. The steps shown in FIG. 3 show the manner in which the extractor 122 obtains profile data indicating the online website pages visited by an audience member. In step 210 the extractor searches the offline databases, such as registration and subscription databases, for profile data relating to individual audience members. The search of the offline databases may be initiated by an instruction received from the console 140. For example, an instruction could be given to collect profile data for all audience members who subscribe to the New York Times. Such an instruction necessitates that the extractor 122 have access to the subscription database for the New York Times.

The extraction rules determine the profile data that is collected. In step 212, the profile data extracted from the offline sources may be stored in the data warehouse. As there may be a need to determine the profile data that is associated with a particular audience member, the extractor may assign a unique identifier to the profile data in step 214. The unique identifier may be a string of numeric, alphabetic, alphanumeric, or other characters that may be used to identify one audience member.

In step 216, the unique identifier may be used to identify content visited by the audience member. The unique identifier may be so used by including it in a domain cookie associated with each website page visited by the audience member. Each of these domain cookies may be stored on the computer associated with the audience member, and may be used to identify each particular website page visited by the audience member as being associated with the unique identifier. In step 218, the extractor may determine the domain cookies that are stored on the audience member's computer. Because these domain cookies include the unique identifier that identifies the particular audience member, the extractor may use these cookies to modify the profile data for a particular audience member to reflect that the audience member visited the website pages associated with the cookies. By combining the profile data obtained from the offline databases with the profile data updates that occur as a result of the audience member visiting website pages, a complete set of profile data may be collected for an audience member, reflecting both offline and online behavior and characteristics for the audience member.

Tracking the online history of an audience member requires that the system be able to uniquely identify audience members. This tracking may be accomplished by combining a unique identifier for each audience member with website pages in the network that the audience member has visited.

Figure 4:
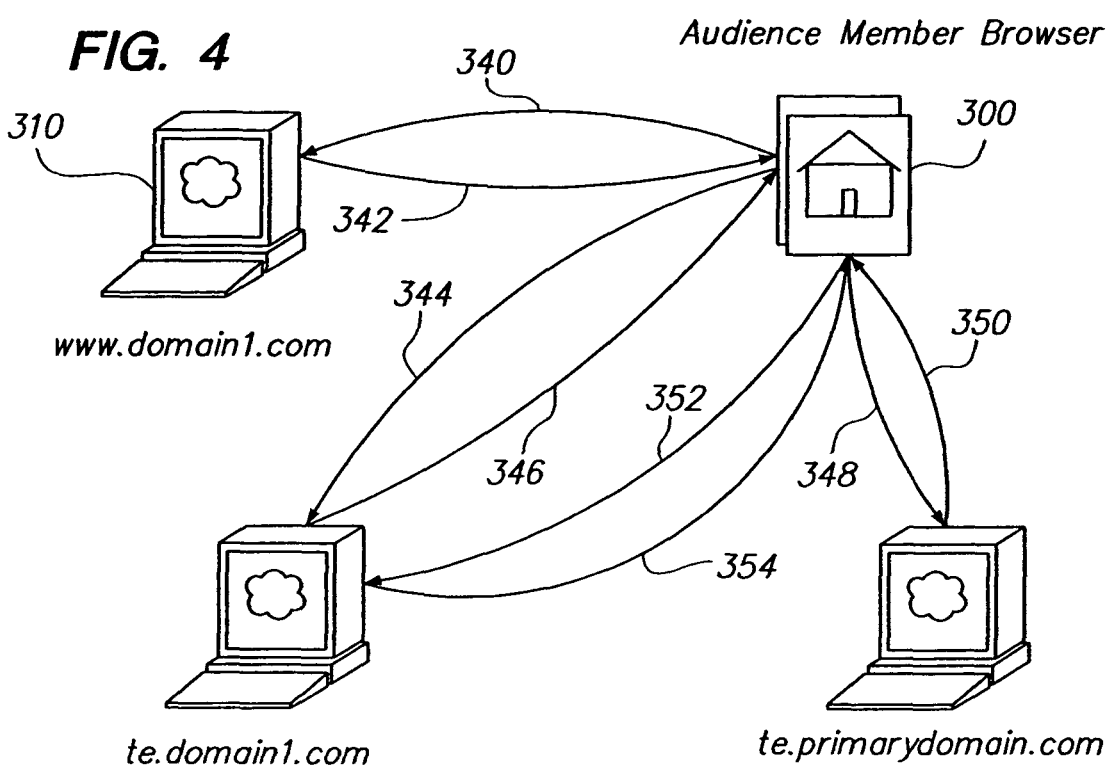
FIG. 4 is a flow diagram illustrating an example of tracking website pages visited by an audience member using a unique identifier.

A method of providing the unique identifier in each of the domain cookies associated with a number of related website pages is illustrated in FIG. 4. Each of the domain cookies associated with the website pages visited by the audience member may be modified to include the unique identifier by designating one of the related website page domains as the primary website domain. A primary domain cookie with the unique identifier is established for the primary website domain. Usually, a network will already have a domain that can be used for this purpose. If not, one of the domains in the network may be designated as the primary domain.

With reference to FIG. 4, an audience member browser 300 initiates the process in step 340 by requesting a website page from a site within the network, www.domain1.com 310. Responsive to the website page request directed to www.domain1.com 310, a page is returned to the browser 300 with an image tag which may reference the targeting engine 152 at te.domain1.com in step 342. In step 344, an image request is sent from the browser 300 to the targeting engine 152. If a unique identifier is not included in the request, in step 346 a redirect is sent to the browser 300 to the targeting engine 152 now referenced as te.primarydomain.com. The redirect includes a reference to the original targeting engine reference in step 344, te.domain1.com. For example, the redirect may be http://te.primarydomain.com/blank.gif?te.domain1.com. In step 348, the browser 300 may send this redirect request to te.primarydomain.com. Responsive to this request, in step 350 a primarydomain.com cookie containing a unique identifier for the audience member is assigned to the browser 300. In step 352, a second redirect is made of the browser 300 to te.domain1.com, that may include the same unique identifier as set in the primary domain cookie. For example, the redirect may be http://te.domain1.com/blank.gif?tid=7dha6wlk9927sha. In step 354, the redirect request is returned with the originally requested image and a domain1.com cookie with the same unique identifier as the primarydomain.com cookie.

After the process illustrated in FIG. 4 is completed, an audience member visit to another website in the network, such as www.domain2.com, may result in a request for an image at te.domain2.com. If the Targeting Engine 152 does not detect a domain2.com cookie with a unique identifier following the image request, the Targeting Engine 152 may redirect a request to primarydomain.com for a cookie. Responsive to this request to primarydomain.com, the primarydomain.com cookie is read and a redirect is sent back to the browser 300 containing the unique identifier contained in the primary domain.com cookie. The unique identifier in the primarydomain.com cookie is the same as previously set. The requested image may then be sent to the browser 300 along with the domain2.com cookie which may have the same unique identifier as the primarydomain.com cookie. This process of providing a domain cookie with the unique identifier is carried out each time the audience member visits a new website page for the first time so long as the new website is related to the other websites in the network from the viewpoint of the Targeting Engine.

The Targeting Engine 152 may be a standalone web server, running on Apache, and using a MySQL database on a shared server, although the Targeting Engine 152 may be variously realized using alternative software and separate servers for Apache and the database. The Targeting Engine 152 may direct the setting of an additional cookie that may contain one or more segment identifiers. These cookies may then be used by other servers, such as, for example, an ad server, an email server, a streaming media server, and/or a web content server, to deliver targeted content to a particular audience member based upon one or more segments in the cookie.

With renewed reference to FIG. 2, the audience segmentation and analysis stage may be carried out by the data warehouse 132. The data warehouse 132 may assign a particular audience member to one or more segments based upon common profile characteristics. A segment of audience members may be defined as a group of audience members to which the system user (such as an advertiser) desires to send the same content. For example, returning to the example discussed above, a segment of audience members may be defined as all audience members that the system user selects to receive a particular golf advertisement. The selection of the audience members for receipt of this advertisement may be based on one or more audience member characteristics in the profile data.

Figure 5:
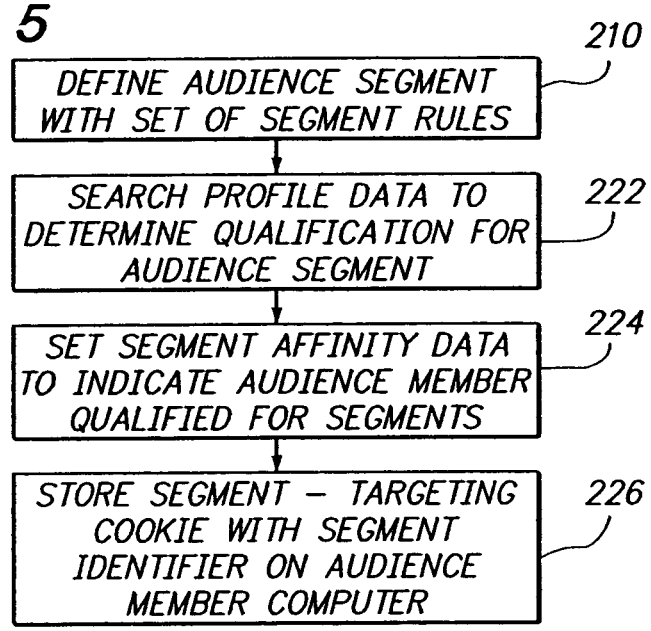
FIG. 5 is a flow diagram illustrating an example of grouping audience members into segments for receipt of targeted content.

A method of associating an audience member with a segment is illustrated in FIG. 5. In step 220, the profile data attribute values of audience members who will qualify for inclusion in the segment may be defined by a set of segment rules. The segment rules may be selected using the console 140. Any of number and/or range of profile data attribute values may be used to govern qualification for a segment. In step 222, the data warehouse 132 may search the profile data to determine the audience members that qualify for the audience segment. This search may be carried out at the request of the system user, and if desired, on a routine basis, such as daily. In this manner, membership in the audience segment may be maintained up to date. In step 224, the data warehouse 132 may store segment affinity data to indicate the audience members that are included in a particular segment. It is appreciated that the segment affinity data may indicate that an audience member is in more than one segment. The segment affinity data is defined by a set of rules based upon the behavior and characteristics in the audience profile. Once a set of rules that define the segment affinity data are identified, a segment identifier is assigned to that particular set of rules. This segment identifier is then sent to the Targeting Engine 152, along with the audience unique identifier assigned previously by the Targeting Engine 152. In step 226, when the Targeting Engine 152 is notified that an audience member has requested a website page in the network, the Targeting Engine stores a segment-targeting cookie on the audience member's computer. The segment-targeting cookie includes the segment identifier that identifies the segments that the audience member is included in. The method of storing the segment-targeting cookie on an audience member computer is described in further detail below in connection with FIG. 6.

Profile data for audience members may also be manually analyzed to build segments. With renewed reference to FIG. 2, the server or servers that host the Targeting Engine 152 and the data warehouse 132 may be operatively connected to the console 140. The console 140 may be used to designate the offline databases used to initially populate the data warehouse with profile information, to set the rules for collecting profile information, and to create and view reports showing audience member profile data, audience member segment affinity data, and audience member Internet activity.

Figure 6:
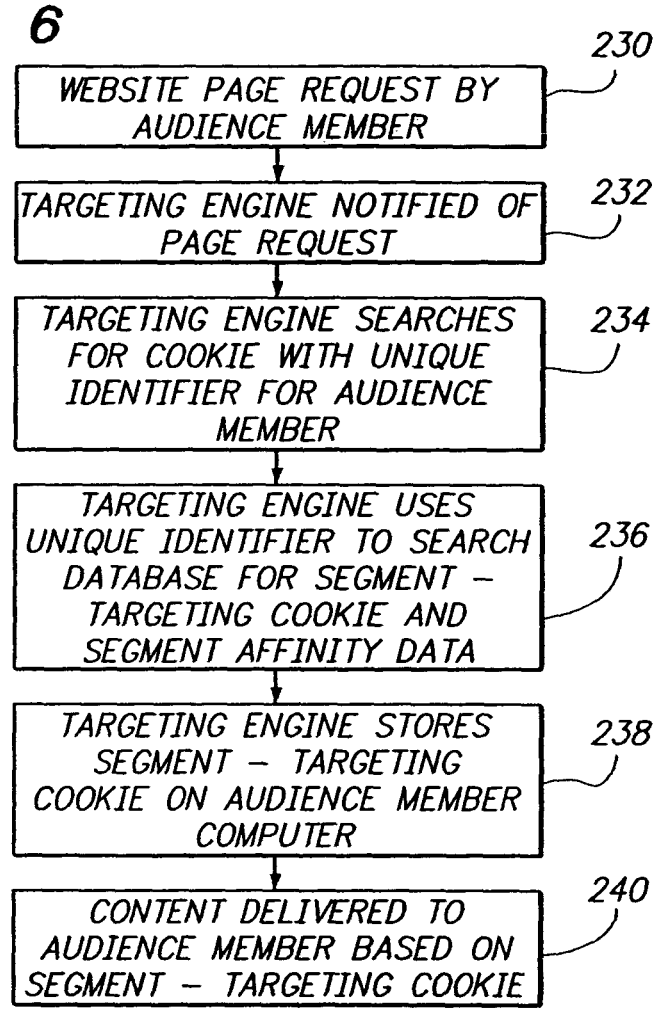
FIG. 6 is a flow diagram illustrating an example of directing targeted content to audience members in a segment.

A method of delivering targeted content to an audience member based on the segment affinity data is illustrated in FIG. 6. With reference to FIG. 6, an audience member requests a website page in the network of related websites in step 230. The Targeting Engine is notified of the website page request in step 232. Responsive to the audience members request for a website page, in step 234 the Targeting Engine determines whether or not a domain cookie, associated with the requested website page, includes a unique identifier for the audience member. If a unique identifier is not identified, the Targeting Engine will provide a website domain cookie with a unique identifier as described above in connection with FIG. 4. Once a website domain cookie is provided with a unique identifier, in step 236 the Targeting Engine may determine whether or not a segment-targeting cookie is already associated with the audience member in the data warehouse. The segment-targeting cookie may include a segment identifier that indicates the segment(s) to which the audience member belongs. If segment affinity data is stored in the data warehouse for the audience member, then a segment-targeting cookie is created and stored in the audience member computer with the appropriate segment identifier in step 238. In step 240, content may be delivered to the audience member based on the segment identifier in the segment-targeting cookie stored in the audience member computer.

If no segment-targeting cookie is identified in step 236, the Targeting Engine may query the data warehouse for any segment affinity data associated with the audience member. If no segment affinity data is stored for the audience member, a default segment-targeting cookie may be stored in the audience member computer. The default segment-targeting cookie may automatically expire after some fixed period of time, such as one day for example.

Once a segment-targeting cookie is stored on the audience member computer, the Targeting Engine may periodically update it with new segment affinity data for the audience member. Updating may occur automatically at fixed intervals, and/or in response to modifications to the profile data for the audience member.

A wide variety of content may be provided to the audience member as a result of the segment-targeting cookie being stored on the audience member computer. With renewed reference to FIG. 2, content may include, but is not limited to website page advertisements, popup advertisements, emails, or the like.

The system 10 of the present invention is adapted to segment and target audience members for delivering content to an audience member across a plurality of digital mediums. The digital mediums may be heterogeneous, and may include, but are not limited to, a website network, a cable system, a non-web based internet network, a wireless communications system, such as a cellular phone or RF network, and/or any digital medium in which the means for interfacing the audience member with the digital content is uniquely addressable. It is contemplated that the digital medium may include other consumer technologies not yet developed.

Figure 7:
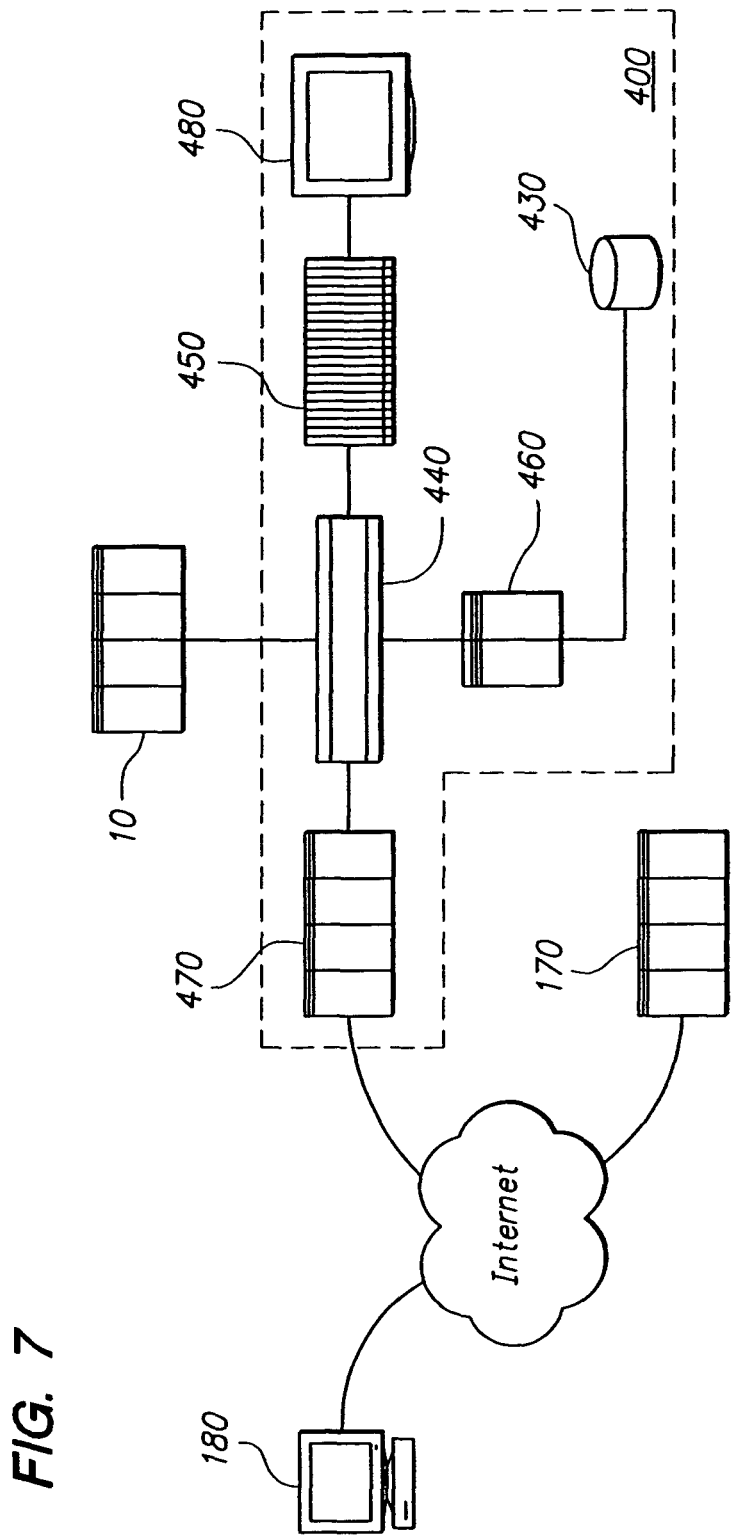
FIG. 7 is a block diagram illustrating another example of a system for delivering content to an audience member.

FIG. 7 is a block diagram illustrating another example of a system for delivering content to an audience member. The system includes a digital cable network 400. The digital cable network 400 may include a home television having a uniquely addressable cable set-top box 480 as a means for interfacing the audience member with digital content. The digital cable network 400 may further include a cable head-end 450 for delivering segment targeted content to the set-top box 480. As will be apparent to those of ordinary skill in the art, the head-end 450 may include means for receiving a digital signal, such as, for example, a satellite receiving antennae, from a programming processor 460. The programming processor 460 programs the content to be delivered to the audience member, and provides the appropriate digital signal to the head-end 450. The programming processor 460 may be in communication with a cable company database 430 which may store, for example, subscription data relating to the audience member. The data may include a unique identifier of the audience member within the cable network 400. The programming processor 460 may interface with the system 10 of the present invention through a cable network/Internet bridge 440. As discussed above, the system 10 may include an audience member profile.

The digital cable network 400 may further include a cable company website provided by a web server 470 and accessible by the audience member via the Internet. The audience member may access the website 470 to request a service, such as, for example, ordering a movie, placing a repair order, and changing the level of cable service. The audience member may access the website 470 by providing the audience member's cable network identifier.

The system of FIG. 7 may be operated as follows for delivering content to an audience member across a plurality of digital mediums. The audience member may visit a website provided by a web server 170. The web server 170 may receive a request for content from the audience member, and provide website pages to an audience member computer 180 in a conventional manner. The website 170 may be owned by, or affiliated with, the owner of the cable network 400 and the website 470. The audience member may visit other sites related to the website 170 within a network. If necessary, a unique audience member identifier related to the website network is assigned to the audience member, and profile data is collected and stored, substantially as described above in connection with FIGS. 3 and 4. The audience member may be associated with an audience segment defined by a set of segment rules substantially as described above in connection with FIG. 5.

The audience member may visit the website 470 to request a service from the cable company, at the same time providing the audience member's unique identifier within the cable network 400. The programming processor 460 may read the audience member's web network identifier, and associate the audience member's cable network identifier with this identifier. The programming processor 460 may then access the system 10 through the bridge 440, and accesses the segment affinity data relating to the particular audience member using the web network identifier. Based on the audience segment affinity data, the programming processor 460 defines the programming rules for the audience segment within the cable network 400. The appropriate digital signal is then sent to the cable head-end 450, and the head-end 450 delivers the audience member targeted content via the set-top box 480 and the audience member's home television. The preferences and behavior of the audience member within the network 400 may also be used to update the member's profile within the system 10. In this manner, the audience member's preference and behavioral data is synchronized across a plurality of mediums into a common profile, and the content delivered to the audience member via those mediums may be customized based upon the characteristics of the profile.

Figure 8:
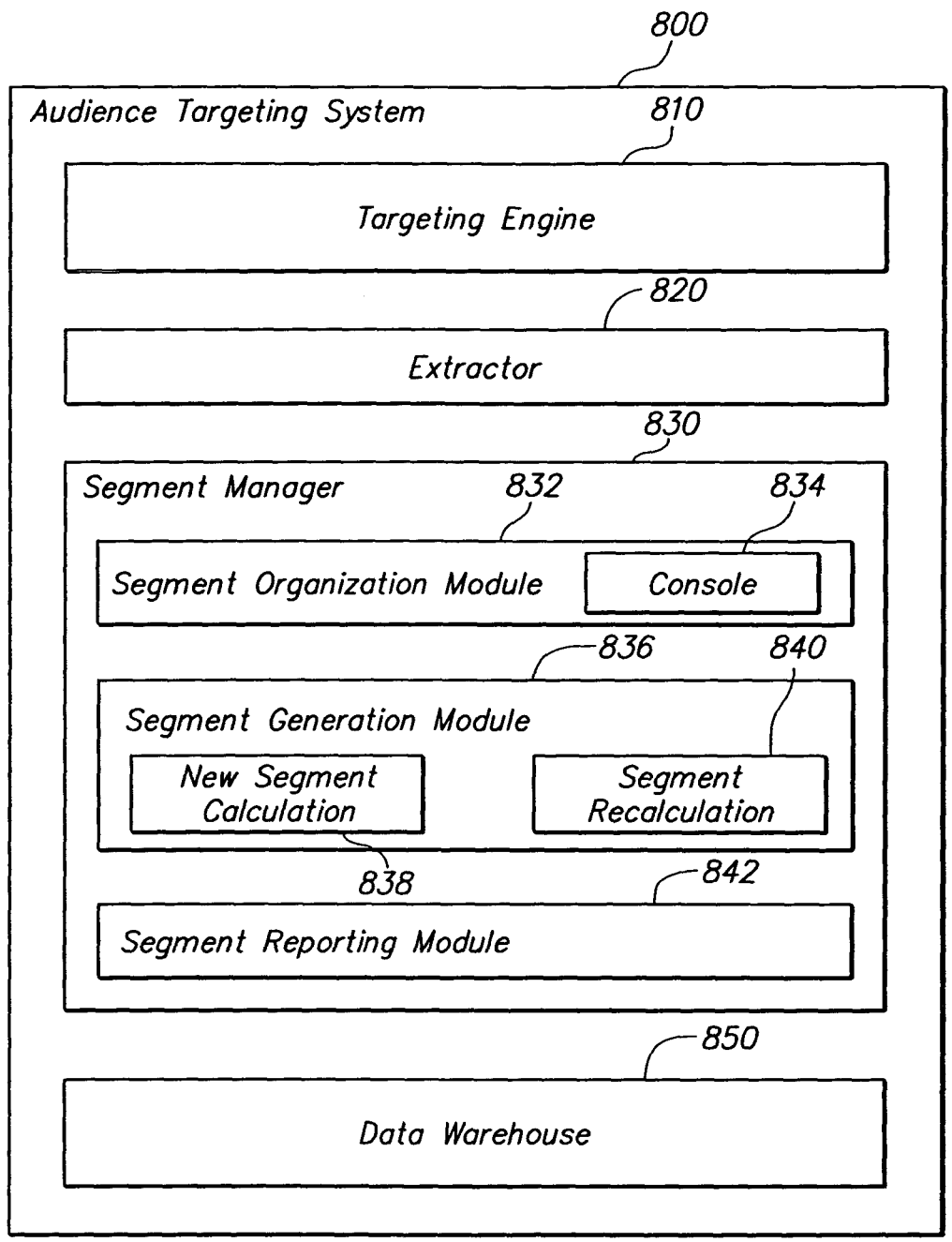
FIG. 8 is a block diagram illustrating an example of an audience targeting system that includes segment management.

FIG. 8 is a block diagram illustrating an embodiment of an audience targeting system 800 that includes a targeting engine (TE) 810, extractor (Extractor) 820, segment manager (SM) 830, and data warehouse 850.

The audience targeting system 800 and its components are illustrated collectively for ease of discussion. As described previously, the various components and corresponding functionality may be provided individually and separately if desired, such as by different servers that are assigned to the functionality of one or more of the components.

The functionality of the audience targeting system 800 is preferably provided by software that may be executed on any conventional processing system, such as those previously named or others. In that regard, the audience targeting system 800 may in turn be a component of a computer system containing a processor and memory. Although one modular breakdown is shown, it should be understood that the described functionality may be provided by greater, fewer and/or differently named components. Although a software embodiment is described, the audience targeting system 800 may also be provided as hardware or firmware, or any combination of software, hardware, and/or firmware.

As previously described, audience segments may be variously calculated, such as on a periodic basis. One model for accommodating audience segment calculation is a batch processing model. For example, at 24 hour intervals the Audience Targeting System 800 may prompt a recalculation of all necessary audience segments based upon previously extracted data as well as any newly extracted data that had been discovered since the previous batch process. While this model is useful for many applications and for certain types of extractable data (e.g., data from registration sources, surveys and $3^{rd}$ party data), it is not always the best model to implement. One issue with the batch processing model is that it can become computationally expensive, particularly where audience segments are recalculated based upon not only previously extracted data, but the newly extracted data. Another issue is that certain data sources may contain data that should be acted on more frequently than dictated by the batch processing interval. The example of the Audience Targeting System 800 illustrated in FIG. 8 accommodates what is referred to as a continuous processing model, although the batch processing alternative is also applicable to embodiments of the present invention.

The regular mining and sending of data to the Extractor 820 may be supported by what is referred to as "dock and shuttle" data extraction described further in connection with FIG. 9 below. The segment manager 830 and corresponding architecture is described further in connection with FIGS. 10A-B below. Recalculation of audience segments based upon incremental data, and processing data tables to manage and produce audience segments are described further in connection with FIGS. 11A-B. Each of these features may be provided in conjunction with the audience matching network aspects of the present invention that are described in connection with FIGS. 14A-B through 17 below.

Still referring to FIG. 8, the Audience Targeting System 800 accommodates the collection and coordination of data across multiple sites, as well as the targeting of audience members. In that regard, a user that wants to target a particular audience defines audience segments of interest. The audience segments correlate to user profile data that may comprise both characteristic and behavioral data. The characteristic data is often found in registration data and includes attributes such as age, gender, ZIP code, and household income. On the other hand, behaviors may include attributes such as which sections were viewed on a site (e.g., sports, entertainment, health), which advertisements were seen (e.g., mortgage rates, allergy medication), referrers (e.g., AOL, Yahoo), the time of visiting the site (point in time, or range), and the frequency of visits to the site. Audience segments may be defined based upon such user profile data. In turn, the audience segments form the basis for the information that is extracted for analysis, reporting and targeting audience members in relevant segments.

Audience targeting is not limited to web applications. For example profile data might include behavioral attributes such as programs viewed, time viewed, etc., and characteristic attributes such as subscriber IDs or the like in applications involving a television set top box.

The TE 810 provides the means for assigning and coordinating unique identifiers corresponding to individual audience members. As previously described, when an audience member logs onto a page for the first time, the TE 810 places a cookie on their browser, which contains a unique identifier. Whenever that audience member returns to the site, the unique identifier is sent back to the TE 810. Based upon the unique identifier, the Audience Targeting System can set a segment cookie, which can be used for the delivery of targeted content such as ads, e-mails, etc. to the audience members computer or other relevant device. The TE 810 may also create logs of this activity. The unique identifier may be referred to as a profile identifier (PRID).

Figure 9A:
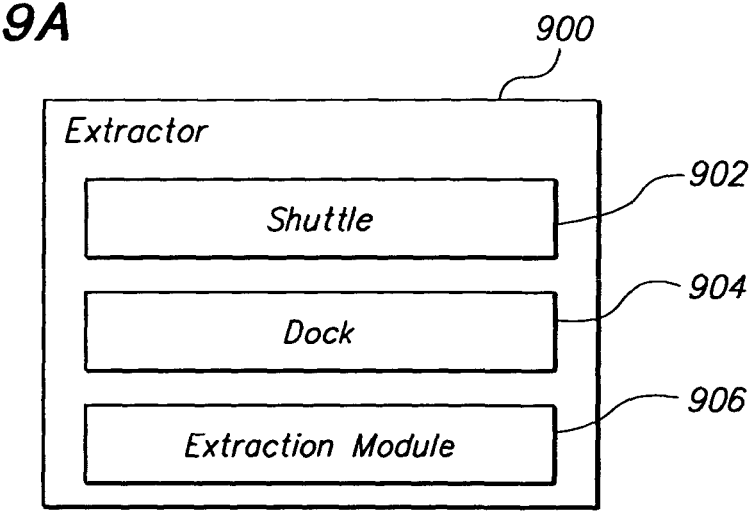
FIGS. 9A-B are respectively a block diagram illustrating an example of a particular extractor 900 and a schematic diagram that exemplifies a model for extracting profile data.
Figure 9B:
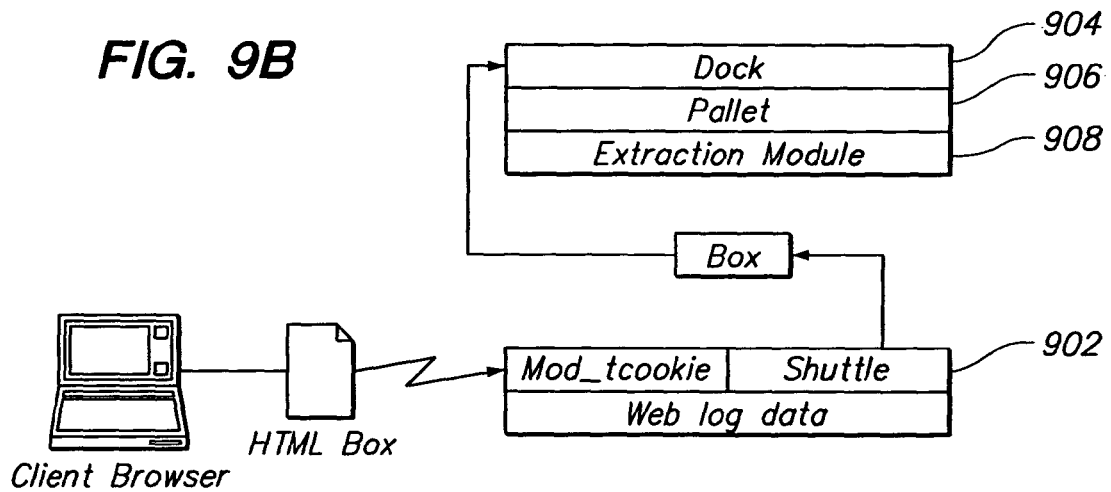

Another example of an extractor 900 is further described with reference to FIGS. 9A-B, which respectively are a block diagram illustrating an embodiment of an extractor 900 and a schematic diagram that exemplifies a model for extracting profile data. Although particular terms such as dock and shuttle are used because they are helpful in conceptually illustrating this aspect, it is noted that various alternative terminology may be used for elements that perform the same functions.

The Extractor 900 includes a shuttle 902, dock 904 and extraction module 906. The functionality of the so-configured Extractor 900 is best understood with concurrent reference to FIG. 9B, which also refers to other elements. The shuttle 902 may be code that resides on the data source. Its purpose is to mine local data locally and send it to the extractor (more specifically, the dock 904 on the extractor). In one embodiment, the shuttle 902 accomplishes this by assembling boxes. The dock 904 receives boxes and, when sufficient boxes are available (or a timeout occurs) creates a pallet 908 out of the boxes. The extractor works on those pallets 908. In order to accomplish this reliably, it is useful for the shuttle 902 to know where the source data resides. For the previously mentioned batch processing embodiments, it is also useful for the shuttle to handle the situation where log files "roll" and are archived by the customer. In this regard, the shuttle 902 interfaces with log data such as that provided by conventional log file generating elements (e.g., Apache).

A data agent may also be employed to assist in the gathering of information from website visitors. This may be provided in the form of code that is added to those pages in connection with which data collection is sought. The code may have header and function call portions that respectively identify the functions and variables that it needs to operate and ensure that all variables have been collected. The data agent may be configured to produce log lines suitable for receipt and processing by the TE. Examples of parameters include the version of the data agent, the page referrer, the page URL, time information, and the PRID. As will be described below in connection with profile synchronization, a REGID parameter may be provided as well. In addition to association with PRID as described, a cookie may delineate a unique REGID for an audience member in the same fashion. Another "cookie list" (CLIST) parameter may be used to identify the list of cookies that should be captured.

The dock 904 is the receiving area on the Extractor that manages the ordering and processing of pallets. Data from the shuttle 902 may be grouped into what is referred to as boxes. Generally, a box contains a single event, but in some cases (e.g. OAS logs) a single record may contain several events. An event may be a time tagged user action on a source server. Examples of events may include a web page view, an ad impression, etc. A pallet 908 may be a collection of boxes, and is typically a collection of data mined from the data source and packaged for delivery to the extractor dock 906.

Various data sources may be supported by this model, but in one embodiment web log data is the data source. The shuttle 902 may be a persistent C++ application that processes data from a log file or pipe. Upon startup, the shuttle 902 finds the current log file (or pipe) and opens it for reading. In addition, the shuttle 902 establishes a connection to the dock 904 in order to be able to deliver pallets 908 to the extraction module 906 for processing.

The shuttle 902 may be configured to process data in a persistent loop until an unrecoverable error or external termination signal occurs. During the processing loop, the shuttle 902 reads up to a configurable number of available items (log lines) from the source and packages them into a box. If there are more items available than the maximum number of items, or if the total size of the items are greater than the maximum box size, the extra lines are written into an overflow buffer and will be inserted first into the next box created.

Once the box has been created, the shuttle 902 sends the box to the dock 904, along with an indication of the size of the box for validation purposes. The extraction module 906 acknowledges and validates the box and responds with an acceptance signal before the shuttle 902 will drop the existing box and repeat the processing loop.

More than one shuttle 902 can connect to a given dock to allow for multiple machines which all serve the same data source (e.g., multiple web servers responding to a single domain via a load balancer). Data from different shuttles 902 in a given dock is sorted into bays. These bays contain the unprocessed data for a given data source from a given shuttle.

The extraction module 908 is preferably configured to handle each data source type, and may include sub-modules for each different data source type (e.g., one for each of OAS, W3C, IIS, etc.).

Finally, the extraction module 906 is responsible for processing data as pallets from the dock 904 and creating the output that gets sent to the data warehouse 850 for final import processing. Basically, the extraction module 908 component performs extraction as described in connection with the previously described embodiment of the Extractor (from FIGS. 1-7). The processed data may be referred to as profile data. In one embodiment, the profile data may be organized and thus provided as fact tables that are described further below.

The segment management aspect is now further described with reference to FIG. 8, which illustrates the segment manager 830 to include a segment organization module 832 that includes a console management module 834, a segment generation module 836 that includes a new segment calculation module 838 and a segment recalculation module 840, and a reporting module 842.

The segment manager 830 accommodates the definition and management of segments corresponding to audience members based upon characteristic and behavioral information. The segments are organized according to a hierarchical logical tree based architecture that allows scalable segment management and accommodates incremental recalculation of segments.

The segment organization module 832 facilitates user-definition of audience segments according to this architecture. It operates in conjunction with the console manager 834 which provide interfaces that allow users to define and configure segments according to the same logical architecture. These interfaces may be in the form of panels that illustrate segments and combinations of segments to produce new segments which will be further understood upon explanation of the architecture below.

The segment generation module 836 generates segments comprising appropriate audience members based upon the so-defined audience segments. The new segment calculation module 838 calculates new segments, and the segment recalculation module 840 calculates existing segments, in particular taking incremental data and recalculating such segments, thus avoiding the need to fully calculate the segment as though it were new each time new data arrives.

The segment generation module 836 may be configured to process segments continuously (e.g., as a Windows service). For each pass, the segment generation module 836 reads a table in the database warehouse 850 that catalogs segments, to determine which segments it should process on that pass. A type identifier associated with the segments may indicate whether the segments are to be calculated anew, and thus passed to the segment calculation module 838, or incremental, and thus passed to the segment recalculation module 840.

Finally, the reporting module 842 communicates with the segment organization 832 and segment generation module 836 and produces customizable reports. The designer is free to structure the reporting options as desired. One example of a report is a "Known Audience Inside/Outside" report, which reports on the behavior of an audience segment in the sections outside the section behavior that defines the segment. For example, An Inside/Outside report on viewers of the News section would show the audience members behavior inside news and compare that to all other sections of the site. This may be used to target valuable behavior on other parts of the site. Another example of a report is a "Reach and Frequency Report", which reports on the reach (total audience) and frequency (number of times seen) for one or more ad campaigns. The reporting module 842 may implement conventional reporting tools including but not limited to Crystal Reports as provided by Business Objects SA, San Jose Calif.

Figure 10A:
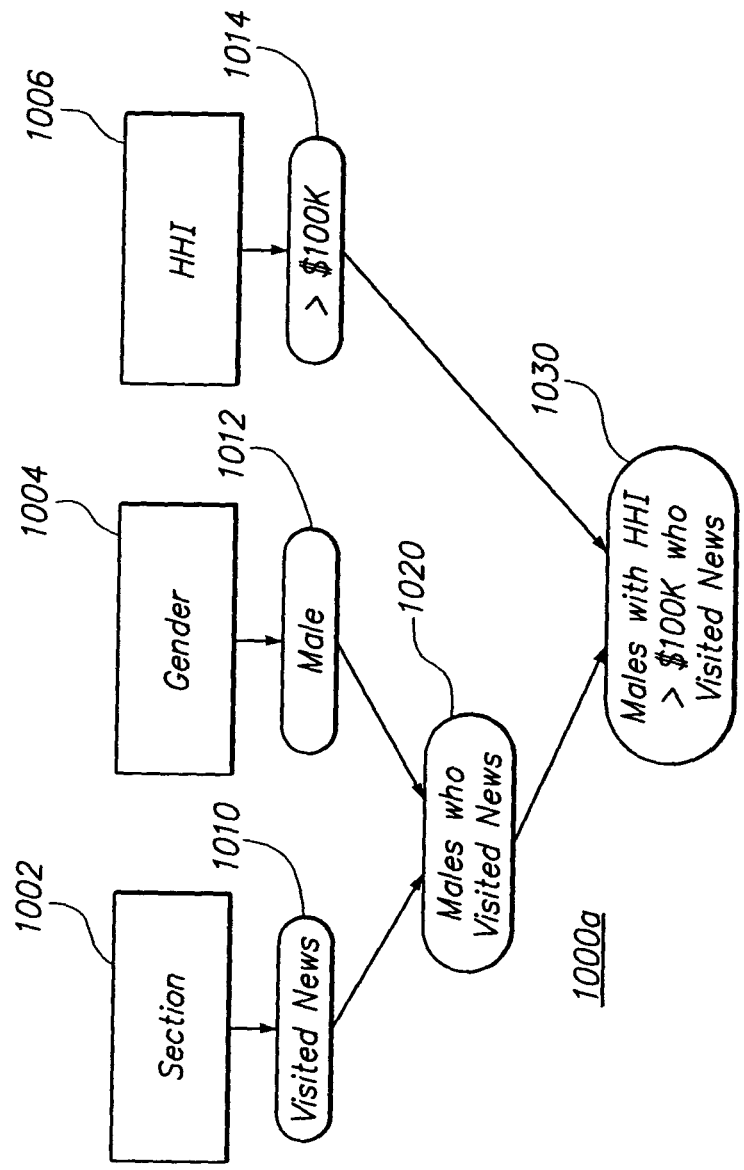
FIGS. 10A-B are schematic diagrams illustrating an example of a segment management architecture and corresponding calculation of segments.
Figure 10B:
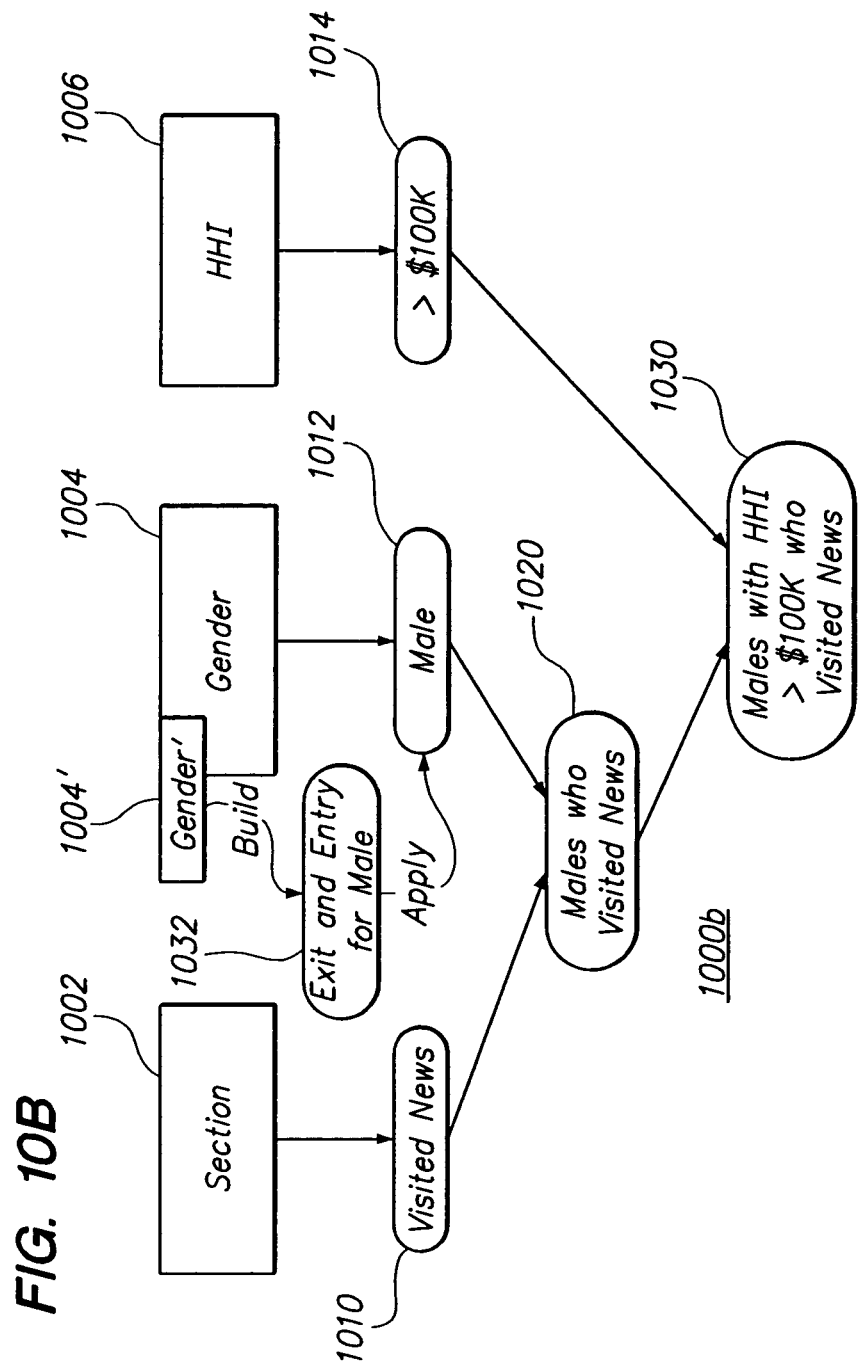

FIGS. 10A-B are schematic diagrams illustrating an example of a segment management architecture 1000(a-b) and corresponding calculation of segments according to another aspect of the present invention. As introduced above, the profile data includes attributes that are correlated to audience members, and is the basis of the audience segment definitions that are used to target audience members with advertisements and/or other content.

Profile data may also be organized as "facts" that have one or more attributes. For example an "Age" fact may have one attribute—Age. However, an "ID" fact may have several attributes such as the PRID or a registration identifier (REGID) that uniquely identifies registration at the site. A "Section" fact may contain attributes for the Section, top level Section (that is, if Section is /News/International/Politics, Top Level Section would be /News), second level section (/News/International), site (site that section belongs to) and full path (Site+Section).

Profile data and the individual attributes comprising the profile data may be categorized as being (1) Characteristics (e.g., Age, Gender, Household Income); (2) Behaviors (e.g., Page Views, Ad Clicks); (3) PRID; or (4) Business Unit ID, which describes the site that a behavior occurred on.

The attributes may also be said to have dimensions or values that may be defined in tables for ease of computation. Moreover, attributes may be further defined based upon whether they are single or multi-valued. For example, Age, Gender, HHI are characteristics for which an audience member will only have a single value (e.g., an audience member cannot be both Male and Female). Conversely, behaviors have multiple values per audience member and some characteristics (e.g., e-mail newsletters subscriptions) also have multiple values.

The hierarchical architecture facilitates efficient calculation of the membership of audience segments. Lists of audience members belonging to particular segments may be maintained. These membership lists may be logically combined to determine the membership of dependent (e.g., child) audience segments.

As indicated, the segment management architecture 1000a includes a series of attribute segments, namely Section 1002, Gender 1004, and Household Income (HHI) 1006 as provided in this example. Base segments have attributes with particular values that correlate to relevant attribute segments 1002-6. Base segments for any number of attributes could be provided (e.g., different behaviors different sections; different gender, different HHI). The illustrated segments are "Visited News" 1010, "Male" 1012, and "HHI>$100K" 1014. Each of these may be considered as separate and distinct segments. However, these segments may also be logically combined to create new segments that depend from them. For example, the segment "Males who have Visited News" 1020 comprises a logical combination of the Males 1012 and Visited News Last 1010 segments. Still further, a third level in the hierarchy of segments may be defined as "Males who have Visited News with HHI>$100K" 1030, which comprises a logical combination of the previously described segment 1020 with base segment 1014 (HHI>$100K). In this fashion, the system may variously organize segments, and this same organization can be used as the basis for guiding the user through the definition of segments via the console manager 834. Notably, there may be instances where a user defines a complex segment directly, wherein the system automatically generates the base and any intervening segments accordingly, to facilitate calculation and recalculation of segments.

For ease of illustration, a logical "AND" operation has been described, which basically provides the intersection of two parent segments. The segment manager 830 supports various additional logical operations or set expressions, including "EXISTS", which inserts entries from one parent; "OR", which inserts entries from the union of two parents; as well as "exclusive AND", and "exclusive OR". Attribute expressions may also be used, such as one which inserts entries from a given parent segment that match specified criteria.

In addition to providing improved organization of segments, the segment management architecture 1000a facilitates proper maintenance of a segment population where incremental profile data is processed, without requiring a full calculation of the segment. That is, introduction of the new information to the existing segment is accommodated through limited processing involving the new information, in lieu of calculating the segment based upon application of its definition to the cumulative set of data. To accommodate this, entry and exit rules are implemented. An "entry" corresponds to an introduction of audience members to a particular segment based upon the incremental data, and an "exit" corresponds to a removal of audience members from a segment. Entries are basically audience members found to currently meet the criteria, but whom are not yet associated with the previously calculated segment. Exits are the opposite—they are audience members found to no longer meet the criteria.

FIG. 10B illustrates an entry and exit 1032 functionality for the segment management architecture 1000*b*. As described above, the Extractor continuously populates the data warehouse with profile data that identifies various attributes. As indicated, a Gender' attribute segment 1004' is generated responsive to incremental profile data. This generally represents audience members that have attributes defined under the attribute segment "Gender" within the incremental profile data. Among those are the previously described "Male" segment 1012. In that regard, exit and entry membership lists are built. Specifically, all audience members identified as being male in the incremental profile data are provided in an entry membership list for the Male segment 1012. Similarly, all those audience members who do not have the relevant attribute (which may be referred to as "not male") are provided in an exit membership list for the Male segment 1012. Exit and entry rules are then used to determine how to accommodate an appropriate update to the segment. The entry may be accommodated by taking the union of the existing membership in Male 1012 with the membership list in the entry membership list for Male. The exit may be accommodated by removing from the existing membership in Male 1012 those audience members listed in the exit membership list (actual removal, of course, would only be applicable for those present prior to the recalculation).

For ease of discussion, focus is made on incremental profile data as it relates to Gender, but the principle of exit and entry can apply to any segment including but not limited to Visited News, HHI and others.

Incremental profile data based recalculation also propagates through the hierarchy. This may be variously arranged, again depending upon exit and entry rules, which in turn depends upon the logical relationships of the segments. For a dependent (child) segment resulting from an AND operation such as Males who Visited News 1020, this may comprise repeating application of the above-described entry and exit membership lists for "Male" to the segment Males who Visited News 1020 in a similar fashion. That is, the entry membership list for Males would be added to the Males who Visited News 1020 segment, and the exit membership list removed. Alternatively, base segments Male 1012 and Visited News 1010 could be recalculated with their respective entry and exit membership lists, and then Males who Visited News 1030 could be calculated based upon the intersection of the updated versions of Male 1012 and Visited News 1010.

Figure 11A:
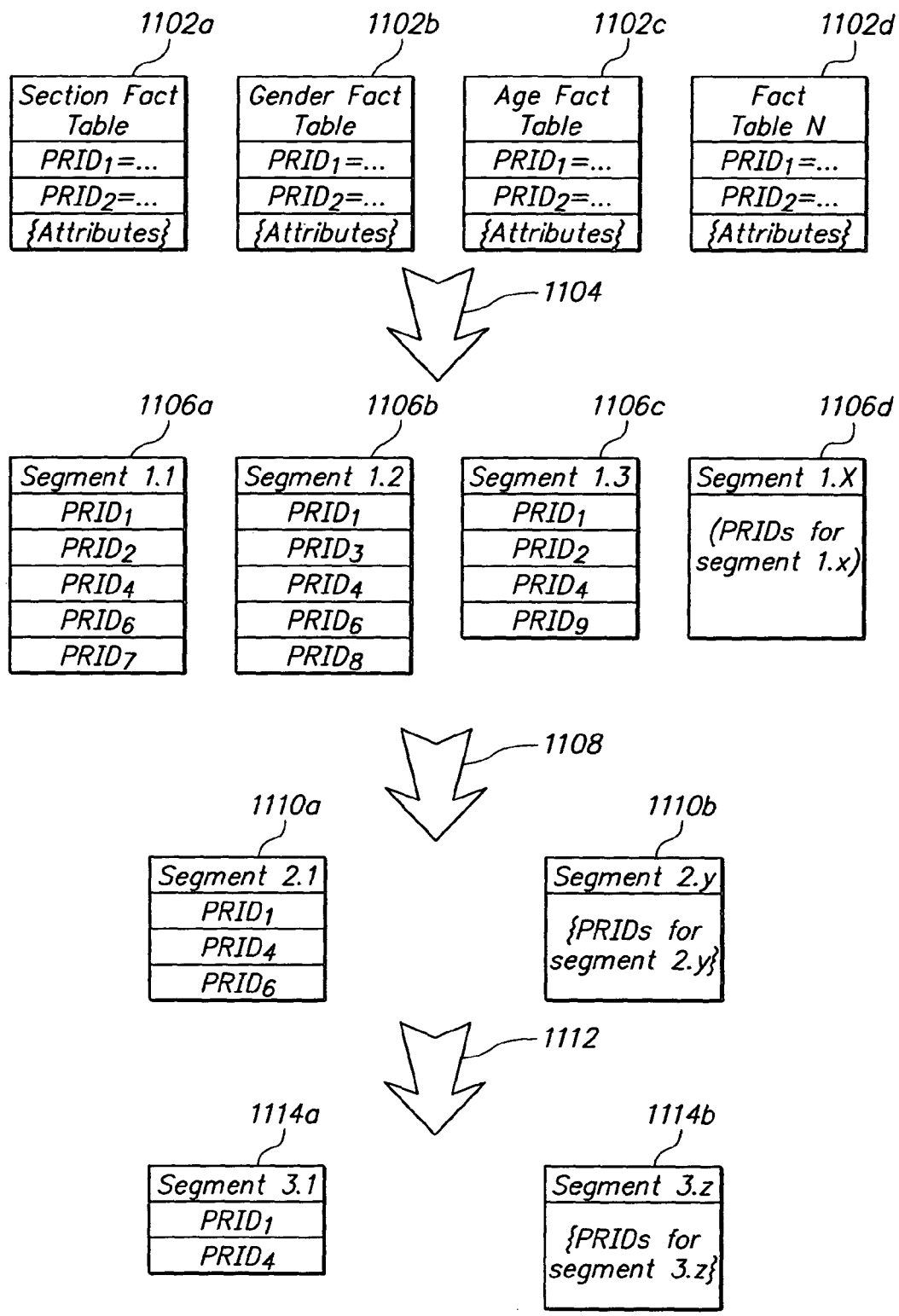
FIGS. 11A-B are schematic diagram illustrating an example of processing data tables to manage and produce segments.

If desired, recalculation of a dependent segment could also be based upon a calculation based upon the updated parent segments. Specifically, the entry and exit 1032 functionality could be applied to the base segments, which could then be used to FIG. 11A is a schematic diagram illustrating an example of processing 1100 data tables to manage and calculate segments according to another aspect of the present invention. The illustrated processing correlates with the segments that are defined in the example of FIGS. 10A-B. As described, the Extractor operates to collect information about numerous audience members and provides such information in the data warehouse. That information may be organized so that attributes corresponding to individual audience members may be identified. The illustrated fact tables 1102*a-d* are a preferred technique for organizing the information as such. In one embodiment, each fact in a fact table is associated with an audience member using their unique identifier (PRID). A fact table contains all facts related to all users for a particular attribute. Accordingly, there is a section fact table that contains all section facts, an age fact table, a gender fact table, etc. Each row in a table represents a piece of data (characteristic or behavior) associated with only one audience member (more specifically one PRID).

As described attributes may involve characteristics such as age and gender as well as behaviors such as the number of times that the audience member has visited a particular section (News, Sports, etc.). At times, an attribute may be determined by looking at multiple pieces of information. Thus, while gender may be a simple determination of whether gender="male", an attribute that includes frequency information such as how many times an audience member visited a particular section may involve counting the number of entries in a fact table for the audience member. This counting may also be constrained to those entries falling within a particular time period.

Various alternatives may be used to provide the functionality of the fact tables, including different organization of the information. For example, the system may alternatively construct a table that provides a listing of attributes for a user identified by a unique PRID. This would result in a number of fact tables respectively corresponding to unique audience members identified by their PRIDs.

As previously described, the Segment Manager accesses the information stored in the data warehouse and maintains segment definitions, such as those input by the user seeking certain audience segments. A given segment is calculated by determining which audience members have the attribute for the given segment. According to this aspect of the present invention, the association of audience member identifiers to attributes and hierarchical logical tree based segment architecture accommodate very efficient calculation (and recalculation) of segments.

A first level of processing 1104 may be used to calculate base segments. This is done by identifying the attribute for a base segment and then determining the audience members (or more particularly the listing of PRIDs) that have that attribute. Presume that segment 1.1 is the "Visited News" segment (see FIG. OA). In this instance, the Segment Manager examines the fact tables and collect the PRIDs for those fact tables that contain this attribute. As indicated in segment table 1106*a*, this may result in a determination that PRIDs 1, 2, 4, 6, and 7 have the given attribute. The listing of PRIDs in a segment table may also be referred to as the "membership list" for the given attribute/segment. Again, there may be millions of members in a segment, the limited listings are used for ease of illustration.

The segments may also be identified by identifiers (SEG-IDs) in lieu of the words and phrases that identify them. Thus associating identifiers $SEGID_{x.x}$ with the noted PRIDs efficiently identifies the audience members with the attribute for computational purposes. Each segment may be organized in this fashion.

Continuing with the example, segment 1.2 may correlate to the attribute "Male". Audience member $PRID_1$ is identified as male, and is listed in the segment table for segment 1.2, but $PRID_2$, identified as female, is not. The table 1106c for segment 1.3 (HHI>$100K) includes both of those PRIDs. Again, segment tables for each of the segments may be provided, for x base level segments (1106a-d).

A next level of segments may then be calculated 1108 from the base segments. This aspect of the present invention accommodates efficient determination of further levels of segments through application of various Boolean operations to the existing segment tables. For example, Segment 2.1 may have been defined as "Visited News" AND "Male". This is accommodated by determining the intersection of the PRIDs in those two segment tables (1106a, 1106b). As illustrated, the segment table 1110a for segment 2.1 thus includes $PRID_1$, $PRID_4$, and $PRID_6$ since those identifiers appeared in both of the two base segment tables. Table 1110a thus lists audience member identifiers for the males who have visited News. Once again, any number of segments may be calculated 1108 at this level, denoted as tables for segments 2.1 through 2.y (1110a-b).

Still further calculation 1110 accommodates determination of the next level of segments. Segment 3.1 ("Males who have visited News with HHI>$100K") correlates to a combination of Segment 2.1 (Males who have visited News) and Segment 1.3 (HHI>$100K). Again, the logical AND implements the intersection of the relevant segment tables, which results in listing $PRID_1$ and $PRID_4$ as belonging to segment 3.1, per segment table 114a. Any number of z segments may be calculated 1112 (segment tables 1114a-b).

Figure 11B:
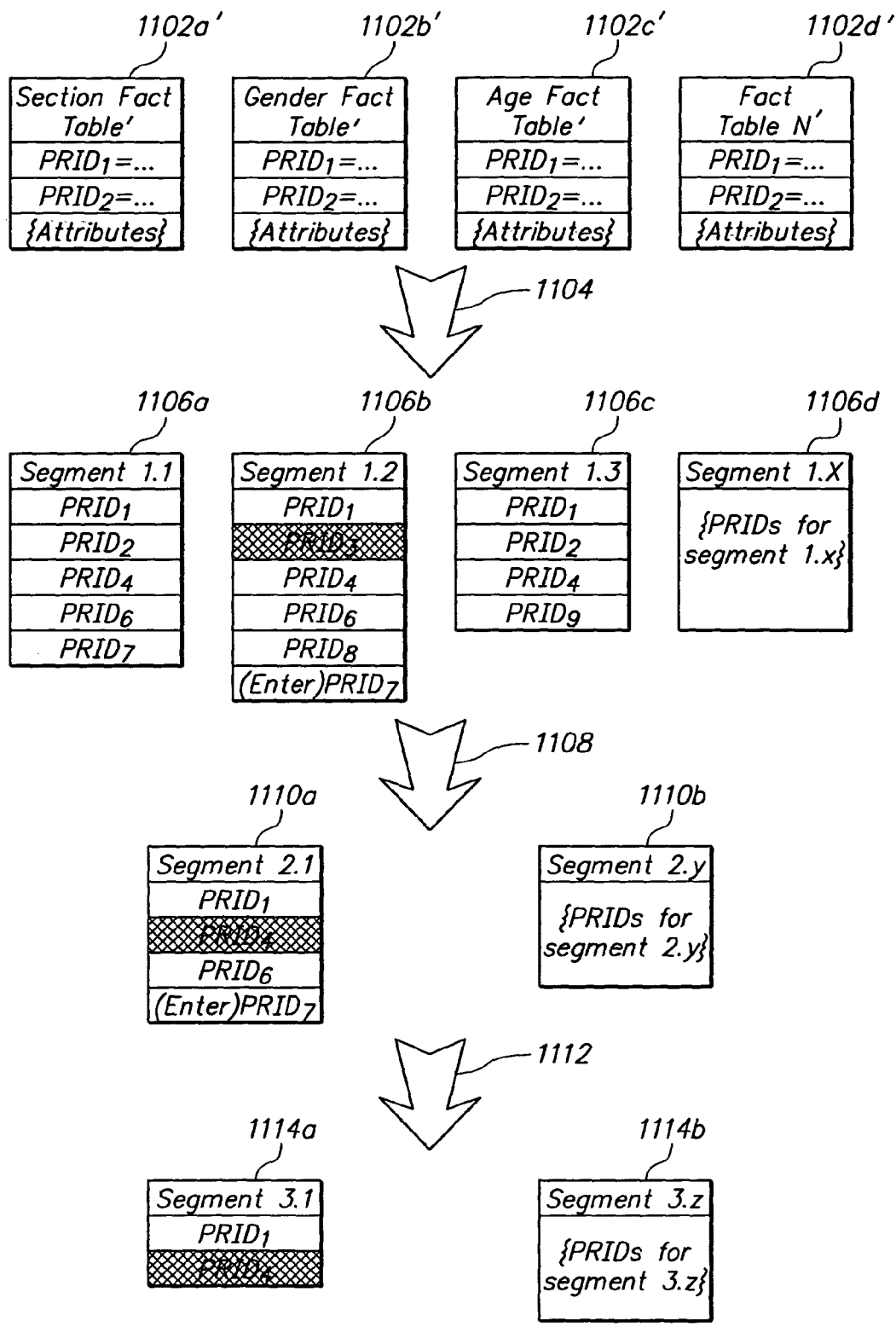

The segment tables are the membership lists for their respective segments, and may be updated accordingly responsive to segment recalculation upon receipt of incremental profile data as previously described. FIG. 11B illustrates how the segment tables are updated responsive to recalculation based upon receipt of incremental data. Here, entry and exit is accommodated by tables containing membership lists, or entry tables and exit tables. As previously described incremental profile data (denoted respectively as fact tables 1102a'-d') is received, and entry and exit tables are built based upon such data. FIG. 11B illustrates how the information in the entry and exit tables is useful for recalculating segments. Suppose that the entry table for the "Males" Segment 1.2 includes $PRID_7$ and the exit table for the same segment includes $PRID_4$. Application of the exit table would prompt $PRID_4$ to be removed from "Males" Segment 1.2 (as denoted by cross-hatching). Application of the entry table would cause $PRID_7$ to be added to the segment (as denoted "entry"). The membership of dependent segments is also updated according to the previously described logic. That is, because $PRID_4$ is no longer a member of Males Segment 1.2, it is also removed from dependent segment Males who have Visited News 2.1. Continuing to the next level of dependency $PRID_4$ is removed from Segment 3.1, but $PRID_7$ is not added because Segment 3.1 is an AND combination of Segments 2.1 and 1.3, and $PRID_7$ is absent from Segment 1.3.

Note that different logical combinations will prompt different application of entry and exit upon recalculation. Segment 2.1 is a logical AND of Segments 1.1 and 1.2; if it were a logical OR combination of those segments, then $PRID_4$ would not be removed unless it was also removed from Segment 1.1.

Another aspect of the present invention provides profile synchronization. People may access various computers throughout the day and week, such as a home computer, office computer, mall kiosk, or the like.

As described above, PRIDs are unique identifiers that are used to identify and gather data regarding unique audience members. In that regard, when a new visitor (e.g., a woman using her office computer) to a web site is encountered, they are associated with the next available PRID (e.g., $PRID_A$). Cookies implemented in conjunction with the visitor's browser then include the particular $PRID_A$ and are used to collect profile data for that visitor. Later on, the same person may use her home computer to visit the web site. Presuming that the home computer has not been used to access the site, there will not be recognition that she is the same person, and a new unique PRID ($PRID_B$) will be generated and associated with her behavior and characteristics from that computer. There will thus be two separate sets of profile data that actually correspond, unbeknownst to the Audience Targeting System, to the same person.

Further, the person may use another computer (e.g., mall kiosk) that accesses the web site, and yet another unique $PRID_C$ may be issued. This is problematic in two ways. First, it creates a third separate PRID for activity corresponding to the same person. Also, the mall kiosk (or even home and office computers) may be used by multiple people. Even though multiple different people are using the computer and engaging in various behavior, it will all be tracked as $PRID_C$.

Still another problem is potential deletion of cookies. Continuing with this example, if this audience member deletes cookies on her office computer, then correlation with $PRID_A$ is lost and she will be perceived as a new visitor on the next web site visit, prompting issuance of $PRID_D$ in association with her office computer. This is problematic because the segments associated with $PRID_D$ will not reflect information previously gathered in connection with $PRID_A$. Also, $PRID_A$ will essentially become a defunct PRID, but will still be wastefully processed by the system.

FIG. 12 is a block diagram illustrating an example of an audience targeting system 1200 that includes profile synchronization 1260 according to another aspect of the present invention. Profile synchronization variously corrects and mitigates problems associated with these conditions. In one embodiment, the PRID is a system based identifier that uniquely identifies an audience member. An authoritative identifier (e.g., a registration identifier) is also sought and maintained in association with a profiled audience member. An authoritative identifier may be identified in connection with some collected profile data. Maintenance of associations between authoritative identifiers and PRIDs allows such collected profile data to be properly associated with a particular audience member despite the absence of a PRID in the collected data. This functionality also accommodates the potential generation of multiple cookie based identifiers by a particular audience member. In contrast to the system identifier (PRID), which may also be referred to as an internal identifier, these cookie based identifiers are examples of external identifiers (XIDs). Maintenance of associations between each profiled audience member's PRID with one or more XIDs allows management of multiple external (e.g., cookie based) identifiers in association with a particular audience member.

Before turning to a more detailed discussion of profile synchronization, it is noted that in embodiments of audience targeting that do not implement profile synchronization, the XID may essentially equate with the PRID for the purpose of audience member profile management. It is also noted that although cookie based XIDs are described, other external identifiers such as those that correlate to usage of a non-web device may also be implemented.

The Audience Targeting System 1200 includes a TE 1210, Extractor 1220, Segment Manager 1230 and Data Warehouse 1250. These elements are analogous to the commonly named elements in the previously described Audience Targeting System (800, FIG. 8) and need not be repeated with regard to the profile synchronization aspect.

As with the previously described system, the Audience Targeting System 1200 and its components are illustrated collectively, but may be provided individually and separately if desired. The functionality of the Profile Synchronization module 1260 is preferably provided by software that may be executed on any conventional processing system. In that regard, the audience targeting system 1200 (or any sub-module) may in turn be a component of a computer system containing a processor and memory. Although one modular breakdown is shown, it should be understood that the described functionality may be provided by greater, fewer and/or differently named components. Although a software embodiment is described, the functionality may also be provided as hardware or firmware, or any combination of software, hardware, and/or firmware.

The Profile Synchronization module 1260 includes an ID Management module 1262, an Authoritative ID Recognition module 1264, and an ID Storage module 1266 that in turn stores profile identifiers (PRIDs) 1268, REGIDs 1270, and XIDs 1272.

Profile synchronization entails a recognition that audience members, and the potential multiple identifiers that they may become associated with, may be associated with an authoritative identifier (ID). The Authoritative ID is in turn used to manage the multiple identifiers as well as the profile data associated with the audience member. In one embodiment, the Authoritative ID is associated to registration (e.g., login credentials, REGID) for the user web site. For example, the web site may be The New York Times web site, which might require registration and login for usage of certain elements of the site.

The Profile Synchronization module 1260 implements PRIDs to uniquely identify audience members even as they generate multiple XIDs. In that regard, PRIDs may be regarded as system level, or more particularly Audience Targeting System 1200 level unique identifiers, and XIDs as audience member machine level based unique identifiers.

To accommodate the profile synchronization functionality, the ID Storage module 1266 stores the various ID information, including PRIDs 1268, REGIDs 1270, and XIDs 1272. The ID Management module 1262 organizes the issuance of and relationships between the various ID information. It accommodates this by associating the PRID for a particular user as uniquely identifying them on the system. This information may be stored along with other characteristics information such as the first date that the audience member was recognized by the system. Tables and the like may also be used to associate the audience member's PRID to the XIDs that are correlated to that audience member using profile synchronization, as well as to the REGID to accommodate recognition of audience members in conjunction with the Authoritative ID Recognition module 1264, which determines the presence of authoritative identification and communicates with the ID management module 1262 to ensure proper issuance of corresponding unique IDs.

The functionality of the Profile Synchronization module 1260 is further described with reference to the flow diagram of FIG. 13, which illustrates an example of a process 1300 for profile synchronization.

In support of the profile synchronization functionality, a new unique XID is associated 1302 with a first time visitor to the web site. If registration is applicable for the session, then the REGID is associated as well. These functions are provided during regular browsing of pages and facilitated by the data agent as described above. Also in the described fashion, the data warehouse is populated with profile data corresponding to audience members. Unique REGIDs are thus also associated to respective sets of profile data along with the unique XIDs.

The profile data may be retrieved 1304 from the data warehouse in the previously described fahion. In embodiments using fact tables, this means that entries identifying both the XID and the REGID will be provided in association with the listed attributes. The fact table includes at least an XID, denoted particularly as $XID_P$ in this example. A first determination 1306 is made as to whether a REGID is also included in the fact table. As described, the REGID is used as the authoritative ID. In its absence, the system seeks to process the data by attempting to associate the fact table with a PRID. As described, a list of XIDs is maintained in association with each PRID. This information is examined to see whether the particular XID (denoted $XID_P$) is found. If found, it is mapped to at least one PRID. It may be possible that an XID is mapped to multiple PRIDs. In that case the system may choose a random PRID, the first one found, or use any algorithm to select one. It should be noted that fact tables may be variously organized to provide this functionality. In one example of this the different attributes (Section, Age, Gender, Referrer, etc.) may each have a different table where a particular value is associated to a particular profile via the PRID.

With profile synchronization, the PRID uniquely identifies audience members for the purpose of segmenting. Accordingly, when it is determined 1308 that a particular PRID is associated with the particular $XID_P$, segments are calculated 1310 associating the attributes in the fact table to that particular PRID. If a PRID is not determined 1318 to be associated with $XID_P$, then a new $PRID_Q$ is issued 1312. In conjunction with that, $XID_P$ is mapped to $PRID_Q$, and segments are calculated accordingly.

If it is determined 1306 that a REGID is present in the fact table, such is construed as the authoritative ID. This may be the first instance that the system sees a particular REGID, in which case a PRID is assigned (denoted $PRID_R$) and mapped to the REGID (1316).

If it is determined 1314 that there is already a PRID associated with the particular REGID (i.e., not the first instance of seeing REGID), then the particular PRID (the unique PRID number for that audience member) is associated to the fact table attributes and corresponding segments. Additionally, if such is not already the case, $XID_P$ is included 1318 in the list of XID numbers that the system has associated to the particular PRID.

If desired, the segment manager may also segregate segments for an audience member using the XID list. For example, a particular audience member may have two XIDs associated to their unique PRID. One XID may correspond to his home computer and another XID may correspond to his work computer. Although the system will (through connection to the authoritative ID as described above) conclude that he is the same person and that all of the activities from both computers could be commonly segmented under the unique PRID, the listing of XIDs in association with that PRID allows the system to generate separate segments if desired. This may in fact be desirable to certain users of the Audience Targeting System since in some instances an audience member may have separate home and office personas in terms of computer usage and desired ad exposure.

Figure 14A:
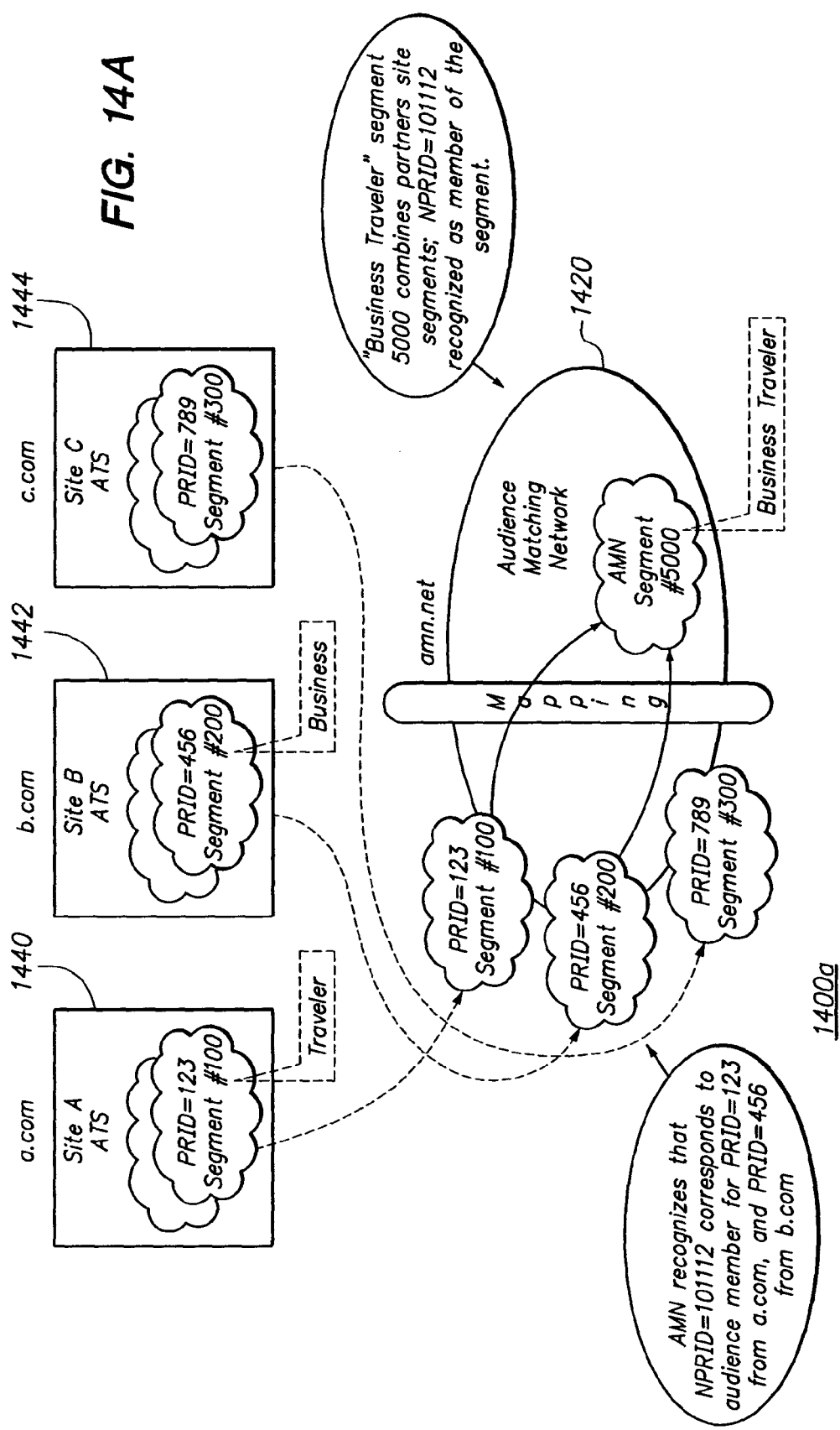
FIGS. 14A-B are schematic diagrams illustrating an example of a network for matching an audience with deliverable content.
Figure 14B:
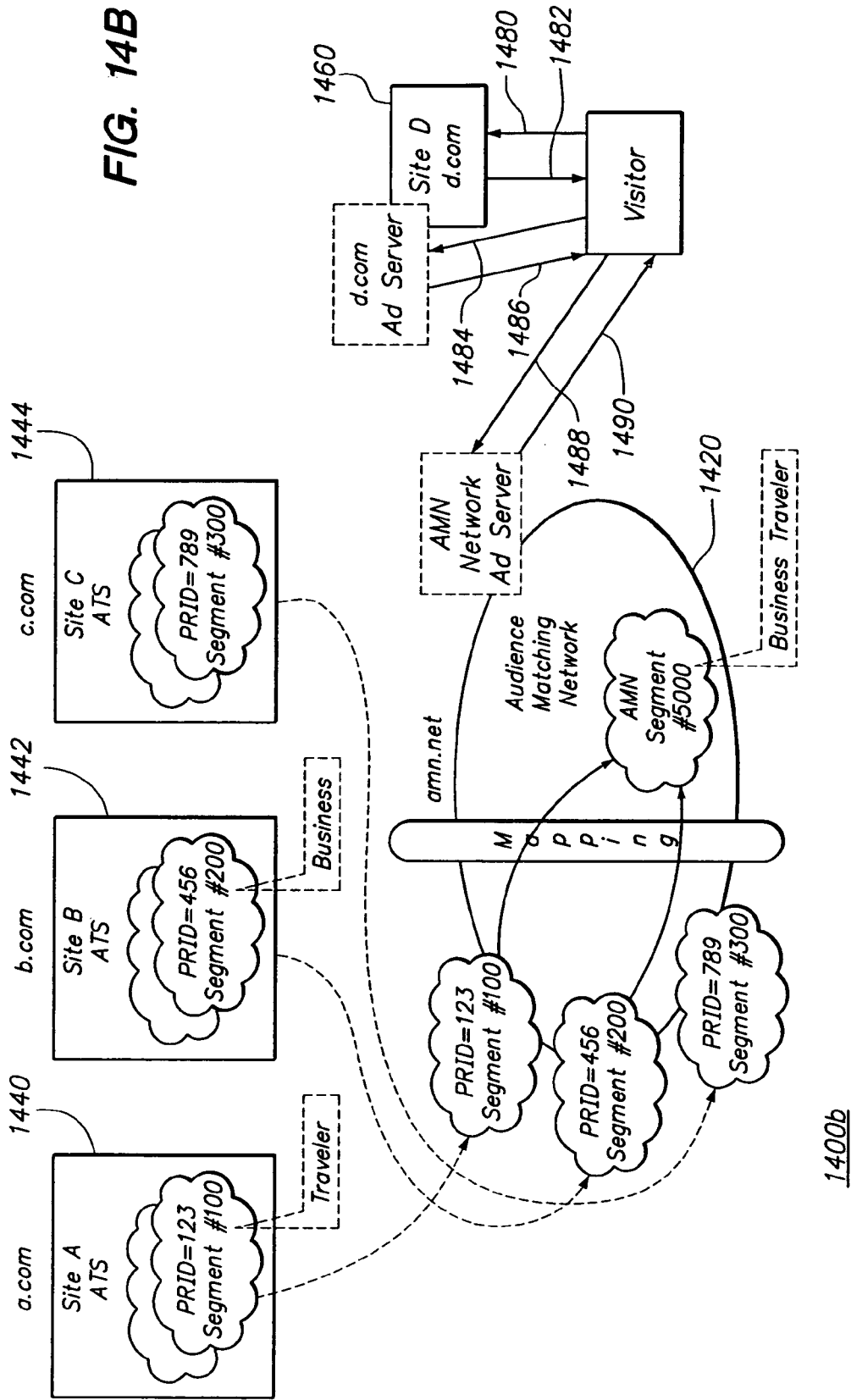

FIGS. 14A-B are schematic diagrams illustrating an example of an Audience Matching Network 1420 according to an aspect of the present invention. The previously described audience targeting systems accommodate the definition of audience segments, the collection of profile data and corresponding determination of membership in those segments, and the delivery of content to audience members falling within such segments. A number of audience targeting systems (ATS) 1440, 1442, 1444 may respectively correspond to domains in which the process of defining segments and delivering content is carried out. Particularly, ATS 1440 may correspond to "a.com", ATS 1442 to "b.com" and ATS 1444 to "c.com." That is, visitors to a.com are audience members that may be targeted with advertising as they navigate among web pages in the a.com domain, via the functionality of the audience targeting system (here, ATS 1440) as previously described in detail.

According to one aspect, the present invention provides a network for matching an audience with deliverable content, which may be referred to as an Audience Matching Network (AMN) 1420. The AMN 1420 is an audience-centric network that allows advertisers to use behavioral targeting in combination with demographic data to reach defined audience segments of significant size. Preferably, the demographic data will be non-personal data. In some embodiments, personal data may be used, as constrained by audience member consent, contractual, and/or legal requirements.

The profile data for audience members may be collected across numerous sites having the audience targeting functionality (e.g., ATS 1440-1444). Each of these sites offers potential segments and population of such segments with members in their respective domains. These domains may also be referred to as "local" domains. These domains may, for example, each correspond to a separate publisher. As is well known, publishers may display online advertisements on pages, and advertisers typically pay publishers to place these advertisements.

The AMN 1420 has a domain (e.g., audiencematchingnetwork.net, or amn.net) that is common to the entire network of sites, which may be referred to as the network domain. The AMN 1420 presides over network level segments that comprise the various segments respectively populated by the ATS 1440-1444. As such, the AMN 1420 is able to organize and manage segments based upon attributes that collectively traverse the network, and that otherwise would not have been identifiable by individual sites.

With continued reference to FIG. 14A, individual ATS may define segments and collect profile data for audience members in the relevant domain. For example, ATS 1440 may uniquely profile a.com audience member "123", under a unique identifier denoted as $PRID_{123}$.

In the illustrated example, a "Traveler" segment may correlate to audience members who have been determined to be interested in travel, such as by their having visited a travel-related page in the domain. This particular segment in the a.com domain is denoted and managed as segment #100. The audience member managed under $PRID_{123}$ is determined to be a member of segment #100 ("Traveler").

It should be noted that this example is illustrative only. As described above in connection with the ATS and segment management features of related inventions, segments may be variously defined according to characteristic and behavioral attributes, including but not limited to gender, section visited, HHI and others. It is also noted that data collection may not be limited to segment data, but may be any data points that a publisher allows the AMN 1420 to collect.

Still referring to FIG. 14A, in the b.com domain, ATS 1442 defines a "business" segment #200 and through collection of profile data within the domain, determines that the audience member uniquely identified in b.com as $PRID_{456}$ is a member of that segment. Further, in the c.com domain, ATS 1444 defines another segment #300 and determined that its uniquely identified audience member $PRID_{789}$ is a member of that segment.

Each of these audience members may be targeted for the delivery of content within respective domains. According to this aspect of the present invention, the AMN 1420 is able to recognize that an audience member that is (separately) uniquely profiled in different domains is in fact the same audience member, and to assemble segments that collectively traverse the numerous domains in the network, so as to determine that such an audience member is a member of a complex segment based upon information collected in the local domains.

The AMN 1420 uses a unique identifier referred to as a network PRID (NPRID) to manage the unique identification of audience members at the network level and to determine segment membership. The AMN 1420 also manages network level segments. For example, a "Business Traveler" segment may be managed as segment #5000 by the AMN 1420, and may be mapped to the segments (#100, #200) respectively defined in one or more of the domains in the network. The segment "Business Traveler" #5000 is shown for ease of discussion and to illustrate how the AMN 1420 may define "complex" segments that result from a combination of segments defined in separate local domains in the network.

The "Business Traveler" segment may be variously calculated, but preferably may comprise individual network level segments "Business" and "Travel" that are hierarchically organized. The determination of membership within base level segments and higher level segments that combine such base level segments may be accommodated through such organization of the segments. Also, membership tables can be used to calculate and recalculate segment membership using the NPRID identifiers at the network level.

As an alternative to having different segment identifiers for local and network domains, it may be more efficient to have a segment definition scheme that is universal to the network and local domains. Such a scheme would use "global" segment identifiers. Thus, for example, both the a.com ATS and the AMN 1420 may define segment #100 as "Travel". This avoids mapping segments. As another alternative, the local domains may collect behavioral and characteristic information for passage to the network domain. The network domain would then collectively have the behavioral and characteristics information upon which targeted delivery of content may be based. The network designer is free to establish the system as desired.

The NPRID may be assigned the first time that an audience member is established with any one of the individual domains in the network, and cookie information may be used by the AMN 1420 to recognize a profiled audience member for future visits, even if such visits are to sites in other domains in the network. Specifically, presume that a particular audience member visits a.com, and that the visit is the first of any site in the network. In connection with this, the particular audience member may be assigned $PRID_{123}$ by ATS 1440. In conjunction with this, the ATS 1440 (or, more particularly, the data agent associated with ATS 1440) directs the particular audience members browser to the AMN 1420, which assigns a unique NRPID (e.g., $NRID_{10112}$) to the particular audience member. In connection with this, the particular audience member browser may be provided with cookie information that identifies the particular audience member as $PRID_{123}$ in a.com and $NRID_{101112}$ in amn.net. Subsequently, the audience member may visit b.com, and be assigned $PRID_{456}$ by ATS 1442. However, when the browser is directed to AMN 1420, the AMN 1420 recognizes the audience member $NPRID_{101112}$ based upon the cookie information and does not assign a new number. The AMN 1420 may, however, retain a listing of PRIDs corresponding to an NPRID. The cookie information may be variously organized. One example uses a local cookie corresponding to the local domain and a network cookie corresponding to the network domain.

The NPRID, in turn, is used to manage network segment membership and other network profile data values. Thus, for example, $NPRID_{101112}$ would appear in the membership listing (e.g., tables) for the network level segments "Business" and "Travel". A combination of these segments would provide a "Business Traveler" segment that would have $NPRID_{101112}$ as a member. Also in connection with the collection of data and determination of segment membership, the AMN 1420 includes a targeting engine that, like the targeting engine in the ATS, may set segment cookies that identify the segments to which a particular audience member belongs based upon any collected network profile data. In this instance, such segment cookies are set in the amn.net domain.

FIG. 14A illustrates, among other things, the data collection role for members of the audience matching network. Another role that is provided in connection with the AMN 1420 is an "Ad Serving" role, illustrated in FIG. 14B. Although data collection may be performed by formal partners that are part of the audience matching network, the serving of ads to audience members who have visited sites in the audience matching network is not necessarily limited to those formal partners. "Non-Partner Site" d.com 1460 illustrates an example of an ad serving site, which serves audience matching network ads but does not collect data. Of course, partner sites may also fill the Ad Serving role.

In addition to allowing non-partner sites to serve AMN ads, the AMN 1420 accommodates the indication whether an audience member currently has any values in the network segment cookie that may be targeted against. The indication may be in the form of an AMN cookie (AMNC) with a Y/N value, where a "Y" indicates that there are values and an "N" indicates otherwise.

The serving of ads may be as follows. Someone visits 1480 the AMN Ad Serving Site 1460 (in the "d.com" domain). The AMN Ad Serving Site will likely incorporate an ad server (the ad server for d.com) to provide advertisements in connection with pages requested by the visitor, and as such the visitor's browser is redirected 1482 to the d.com ad server (1484). An initial determination is made whether AMNC is set to "Y" in connection with the visitor's browser. If this is not the case (or the AMNC Y/N is completely absent), then the d.com ad server serves non-AMN-network ads to the visitor's browser in convention fashion. However, if the AMNC is set to "Y", then the browser is redirected 1486 to the ad server in the amn.net domain (1488). There, the visitor is recognized as, say, $NPRID_{101112}$ and is served 1490 ads appropriate for the segments in which $NPRID_{101112}$ is a member.

Figure 15:
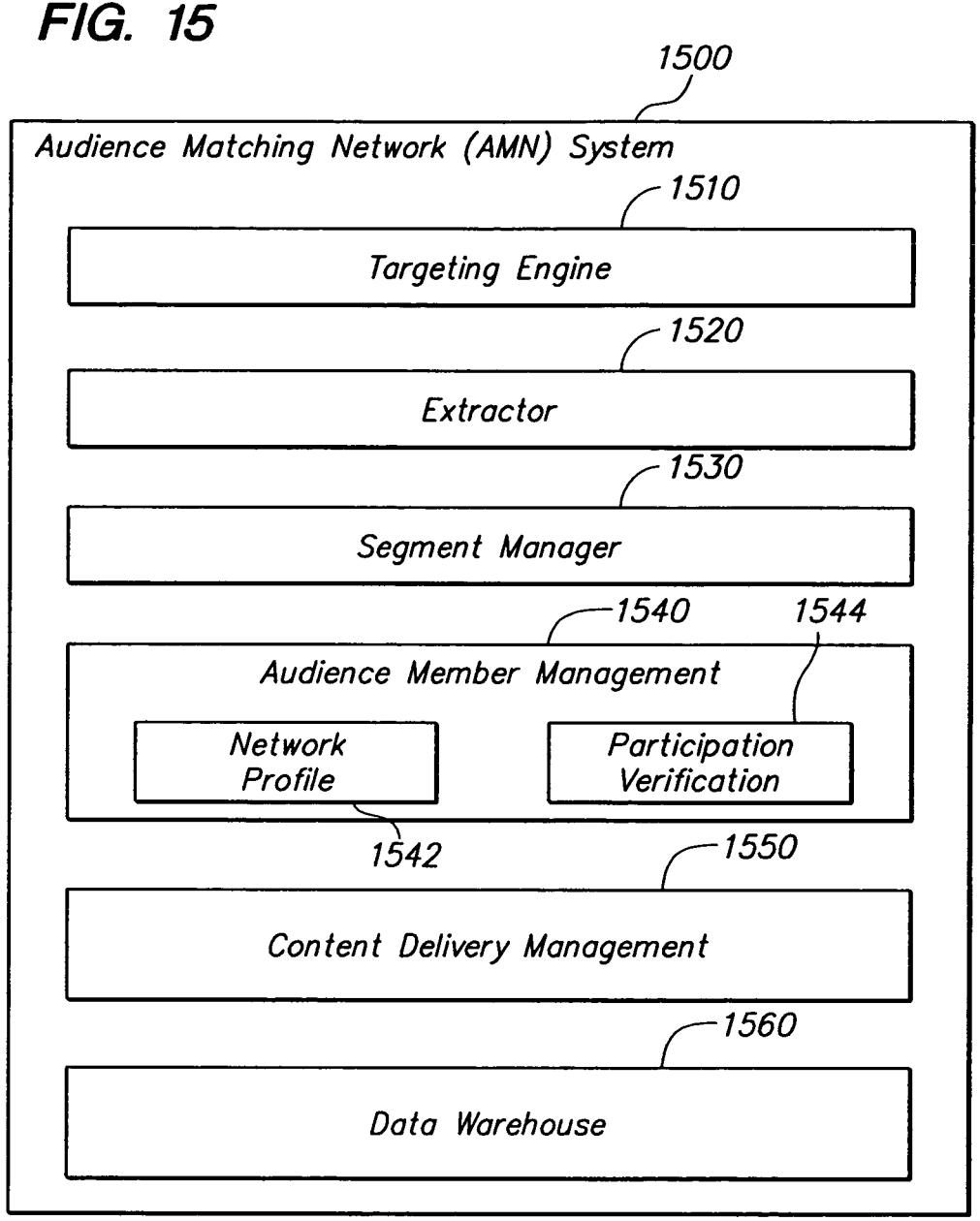
FIG. 15 is a block diagram illustrating an example of an audience matching network system.

FIG. 15 is a block diagram illustrating an embodiment of an AMN System 1500 that includes a targeting engine (TE) 1510, Extractor 1520, Segment Manager 1530, Audience Member Management 1540, Content Delivery and Management 1550, and Data Warehouse 1560 modules.

The AMN System 1500 and its components are illustrated collectively for ease of discussion. The various components and corresponding functionality may be provided individually and separately if desired, such as by different servers or agents that are assigned to the functionality of one or more of the components.

The functionality of the AMN system 1500 is preferably provided by software that may be executed on any conventional processing system, such as those previously named or others. In that regard, the AMN system 1500, or individual elements thereof, may in turn be a component of a computer system containing a processor and memory. Although one modular breakdown is shown, it should be understood that the described functionality may be provided by greater, fewer and/or differently named components. Although a software embodiment is described, the AMN system 1500 may also be provided as hardware or firmware, or any combination of software, hardware, and/or firmware.

As with the previously described analogous component in the ATS, the TE 1510 accommodates the assignment and coordination of unique identifiers corresponding to individual audience members in conjunction with the collection of data and the setting of cookies to support such collection of data, and, ultimately, the delivery of targeted content to the audience members.

With the AMN System 1500, when an audience member logs onto a page for the first time in the domain, the TE 1510 places a cookie on their browser, which contains a unique identifier. In contrast to the TE for the ATS, the domain is the audience matching network, which comprises the local domains of the various partner sites. Accordingly, the unique identifier for the network is set the first time any page for any partner site is visited.

This network level unique identifier is referred to as an NPRID, as described above. Although individual local sites may manage a profile through the previously described PRID, the AMN System 1500 uniquely identifies an audience member network-wide through the NPRID. Whenever a particular audience member with a previously assigned NPRID returns to any partner site (e.g., a.com, b.com, or c.com in FIGS. 14A-B), the unique NPRID is sent back to the TE 1510. Using the NPRID as a basis to identify the audience member, the AMN System 1510 can set a network level segment cookie, which is subsequently used for the delivery of targeted content to the audience member's device. The TE 1510 may also create logs of this activity, useful for performance and revenue determinations.

The issuance of NPRIDs may be provided in conjunction with an Audience Member Management module 1540, which includes an network profile module (NPM) 1542 and a participation verification module 1544. The NPM 1542 manages the issuance of NPRIDs and retains lists of PRIDs corresponding to each unique NPRID. It may also communicate with the Segment Manager 1530 and thereby retain the lists of segments to which an audience member defined by an NPRID belongs.

The participation verification module 1544 accommodates the management of the AMNC value, including setting of the AMNC and changes to the AMNC setting. The AMNC accommodates an indication whether the corresponding audience member has values that may be targeted against.

The Extractor 1520 for the AMN System 1500 is similar to that for the ATS (FIG. 8, element 820), functioning in the network domain rather than the local domain.

Particularly, the AMN System 1500 Extractor 1520 similarly uses a data agent that is employed to assist in the gathering of information from website visitors, again provided in the form of code that is added to those pages in connection with which data collection is sought. That data agent may be thought of as having a network component and several local components, corresponding to the local domains. The primary difference is that the local data agent component sends data within the local domain, whereas the network data agent sends data within the network domain. As with the previously described data agent, the code may have header and function call portions that respectively identify the functions and variables that it needs to operate and ensure that all variables have been collected. The data agent may also be configured to produce log lines suitable for receipt and processing by the TE. Examples of parameters include the version of the data agent, the page referrer, the page URL, time information, and the NPRID. Furthermore, the data agent may be used to carry out the setting of cookies related to the described AMNC value for determining participation in the AMN.

The Segment Manager 1530 is preferably as previously described in connection with the ATS Segment Manager (830, FIG. 8), and thus similarly includes segment organization, console management, segment generation with calculation & recalculation, and reporting modules, which need not be re-described. Notably, the Segment Manager 1530 accommodates the definition and management of segments corresponding to audience members based upon characteristic and behavioral information. The segments may be organized according to a hierarchical logical tree based architecture that allows scalable segment management and accommodates incremental recalculation of segments. Membership lists may be used to determine which audience members are part of which segments, with calculation and recalculation of segments upon exit and entry being processed in the same fashion. The significant distinction between the ATS segment manager and the AMN Segment Manager 1530 is that, in lieu of using the PRID as the basis for determining membership in segments, the Segment Manager 1530 uses the described NPRID. As described above, the Segment Manager 1530 may map ATS segments to network segments. Alternatively, ATS in the local domains may merely provide characteristic and behavioral information to the Segment Manager 1530, which collects the information and manages the definition and population of segments in any fashion that is desired.

The Content Delivery and Management module (CDMM) 1550 allows the determination of which advertisements (or other content) are to be delivered to which network-level audience segments. In the context of this aspect of the present invention, this may merely be an identification of which advertisement corresponds to which segment. This functionality, and the corresponding information, may be exported to the AMN Ad Server for efficient serving of ads to visitors of sites in the network.

In addition to identifying the association of advertisements to segments, the CDMM 1550 may manage a bidding process whereby advertisers bid on AMN audience segments. The CDMM 1550 may also apply revenue and performance based management of audience segments and corresponding accounting. These aspects are described further in connection with FIG. 17 et al. below.

Finally, the data warehouse 1560 is populated with and stores the various profile data as previously described, but does so at the network level.

Figures 1, 16B:
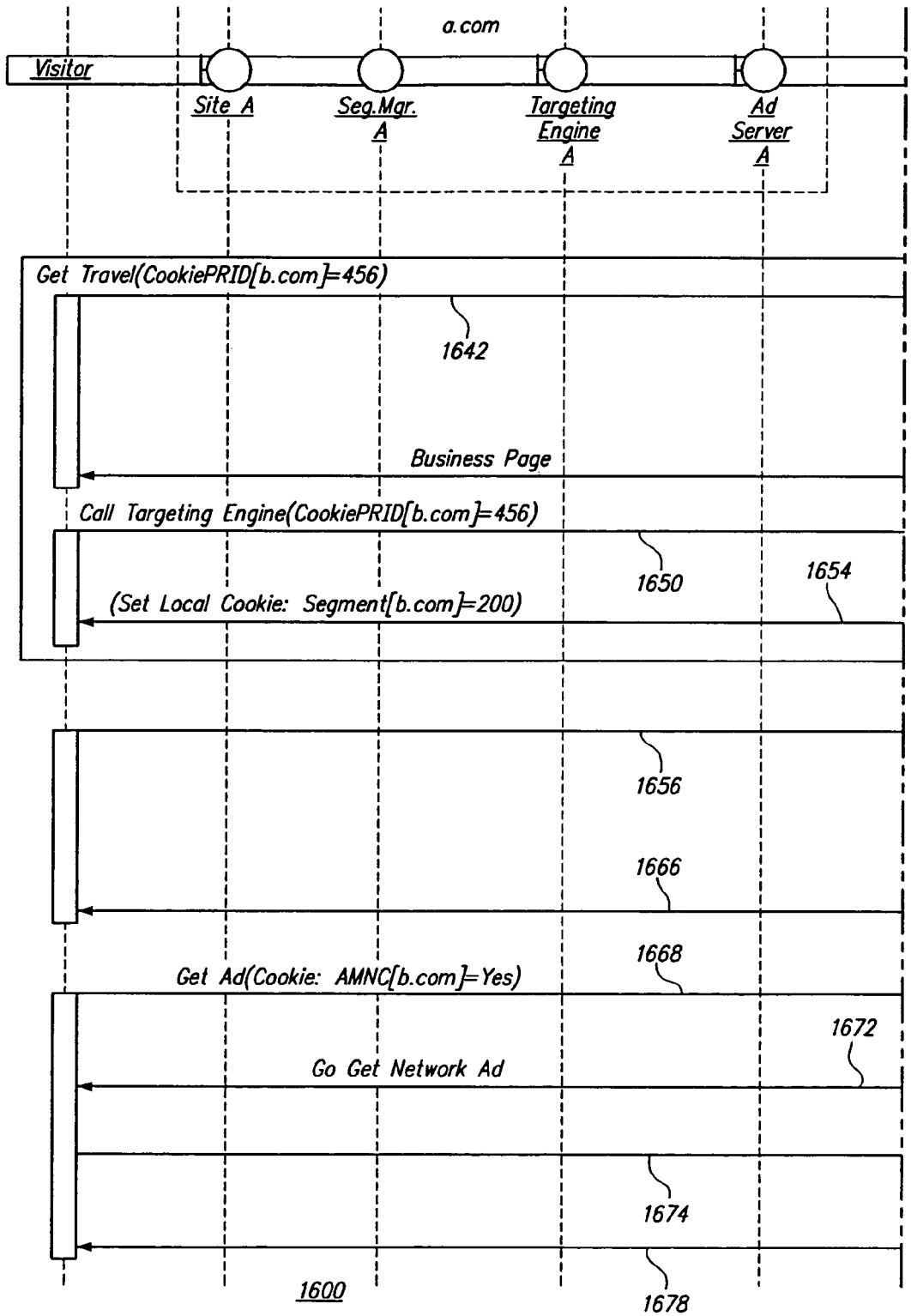
Figures 2, 16B:
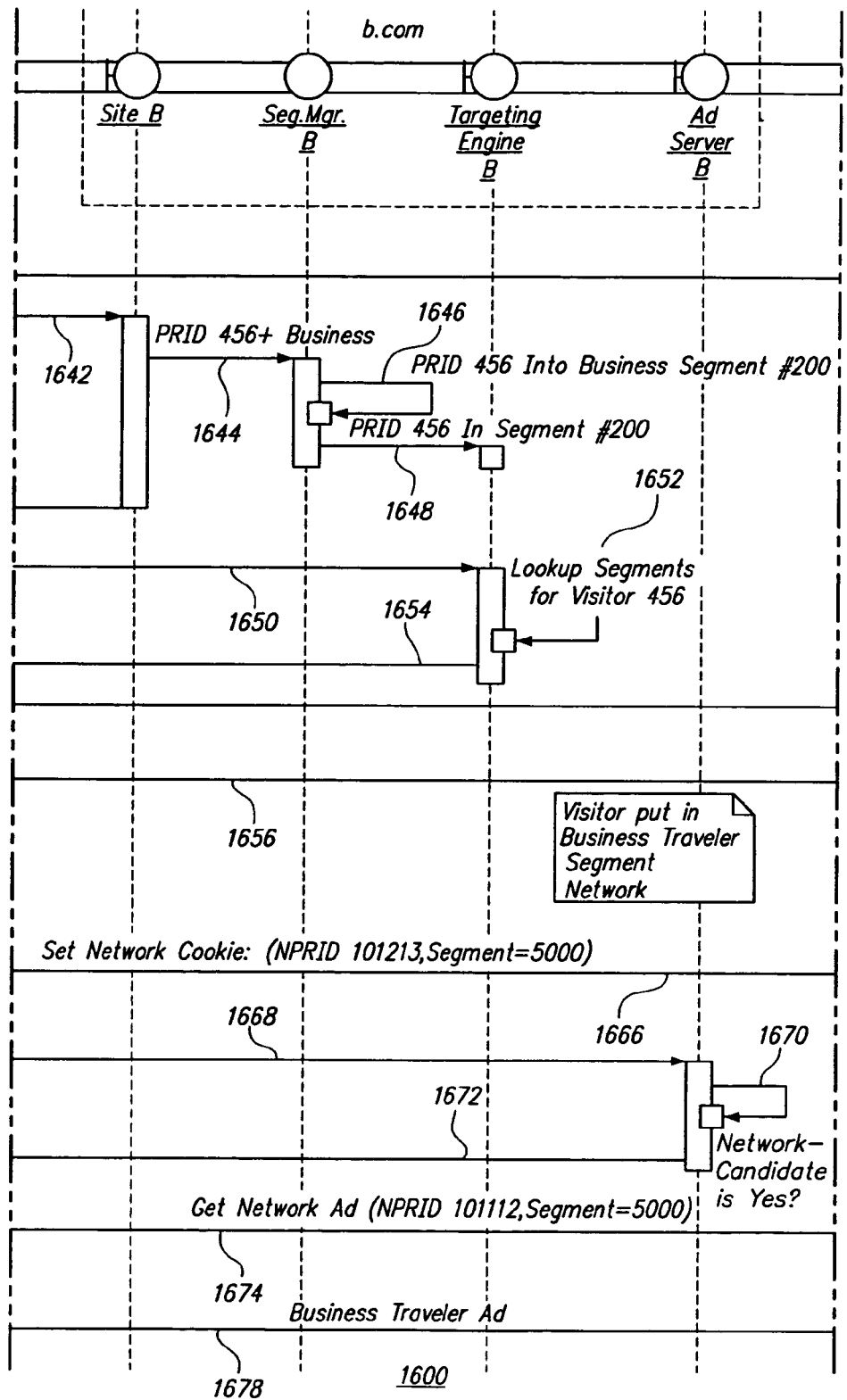

FIGS. 16A-B are event diagrams illustrating an example of a computer implemented process 1600 for matching audience members to deliverable content according to the present invention. The described components of the AMN System are segregated to give a further understanding of the process 1600. For the a.com and b.com domains, the site and ad server are illustrated, as are the segment manager and targeting engine components of the ATS. For the amn.net domain, the AMN ad server, AMN targeting engine and AMN segment manager are shown.

The process initiates with a visitor (aka an audience member) requesting 1602 a page from Site A. In this instance, the audience member has been previously engaged and assigned $PRID_{123}$, and the requested page is related to travel, or is among those pages deemed to indicate an current interest in travel. Accordingly, the data agent for the domain causes a communication to be sent 1604 to Segment Manager A, indicating that the audience member with $PRID_{123}$ has requested the relevant page. This is just an example of various behavioral and characteristic information that could be provided to a segment manager. In response, Segment Manager A processes 1606 received profile data, resulting in the inclusion of audience member $PRID_{123}$ in the travel segment, denoted as segment #100.

The segment information is passed 1608 to the Targeting Engine A. The visitor's browser is also prompted to call 1610 the Targeting Engine A, which receives the PRID, determines 1612 which segments correspond to that PRID, and then sets 1614 a local cookie to include a reference to the segment. Here, $PRID_{123}$ is associated with segment #100 in the a.com domain, so Targeting Engine A acts accordingly. Data agent code on a page visited by an audience member may initiate the call 1610. In this context, it would be any page subsequent to the page that generated the aforementioned data.

The AMN data agent also prompts the visitor's browser to provide 1616 information to the AMN Targeting Engine. For this example, the audience member is assumed to have previously been identified by the AMN System and as such has already been assigned $NPRID_{101112}$. The inclusion of this audience member in a.com segment #100 is among the provided information, which is passed 1618 to the AMN Segment Manager, which then maps 1620 the a.com segment #100 to the AMN segment for Traveler, denoted as segment #4000. As described previously mapping is optional, and other forms of local collection and network organization of behavioral and characteristics information that do not require mapping or even local segment definitions may be used.

Finally, the AMN Segment Manager reports 1624 back to the AMN Targeting Engine, specifically that $NPRID_{101112}$ is a member of network segment #4000. The AMN Targeting Engine then sets 1626 two cookies. The local (a.com) cookie is set to include identification that AMNC=Y, and the (AMN) network cookie is set to indicate that the audience member $NPRID_{101112}$ is a member of network segment #4000 (and any other network segments to which the audience member belongs).

In connection with visiting site A, the audience member browser is also directed 1628 to the a.com domain Ad Server A to for advertisements (these may be those populating the currently visited page). In connection with this, Ad Server A is configured to inquire 1630 whether AMNC is set to indicate that an AMN network ad should be served, with the "Y" value indicating such to be the case. Presuming that AMNC does indicate this, the Ad Server A redirects 1632 the visitor's browser to the AMN Ad Server. (If AMNC=N, the Ad Server A would simply serve a local advertisement).

The previously described setting of the network cookie includes the identification of the audience member as $NPRID_{101112}$ as well as membership in segment #4000, and this information is thus sent 1634 to the AMN Ad Server in connection with obtaining the network ad. The AMN Ad Server processes 1636 this information, which results in sending 1638 the advertisement associated to the traveler segment to the particular audience member.

Continuing with the description of the process 1600 in connection with FIG. 16B, the audience member may similarly visit the b.com domain. The sequence of recognizing the audience member in connection with behavior that suggests "business" interest is particularly described. As was the case with the visit to the a.com domain, here the audience member requests 1640 a page identified as noting an interest in business. The audience member is (again, previously) identified as $PRID_{456}$ by the b.com ATS and as such the local cookie notes this information. The b.com domain data agent causes a communication to be sent 1644 to Segment Manager B, indicating that this audience member $PRID_{456}$ has requested the business page, and the Segment Manager B processes 1646 the information accordingly, resulting in the inclusion of audience member $PRID_{456}$ in the business segment, denoted as segment #200.

The Segment Manager B passes 1648 the information to the Targeting Engine B. Again, the visitor's browser is also prompted to call 1650 the Targeting Engine B, which receives the PRID, determines 1652 which segments correspond to that PRID, and then sets 1654 the local cookie to include a reference to the segment (#200).

As with the previously described visit to a.com, the AMN data agent prompts the visitor's browser to provide 1656 information to the AMN Targeting Engine. The audience member has previously been identified by the AMN System and assigned $NPRID_{101112}$. The inclusion of this audience member in b.com segment #200 is among the provided information, which is passed 1658 to the AMN Segment Manager. If necessary, the AMN Segment Manager maps 1660 the b.com segment #200 to the AMN segment for Business.

The AMN Segment Manager may also determine membership in segments that result from a combination of local segments. Here, membership in "Business Traveler" is determined based upon membership in "Traveler" from data collected in the a.com domain, and membership in "Business" from data collected in the b.com domain. This "Business Traveler" segment may also be organized and managed numerically, such as network segment #5000 as noted. Also in connection with the segment, a determination 1662 is made whether the segment is targetable.

The AMN Segment Manager similarly reports 1664 to the AMN Targeting Engine that $NPRID_{101112}$ is a member of network segment #5000. The AMN Targeting Engine then sets 1666 the local and network cookies, with the local (b.com) cookie set to include identification that AMNC=Y, and the (AMN) network cookie set to indicate that the audience member $NPRID_{101112}$ is a member of network segment #5000.

The audience member browser is also directed 1668 to the b.com domain Ad Server B for advertisements. Ad Server B is configured to determine 1670 whether AMNC is set to indicate that an AMN network ad should be served, and if so redirects 1672 the visitor's browser to the AMN Ad Server. The identification of the audience member as $NPRID_{101112}$ as well as membership in segment #5000, is sent 1674 to the AMN Ad Server in connection with obtaining the network ad. The AMN Ad Server processes 1676 this information, which results in sending 1678 the advertisement associated to the business traveler segment to the particular audience member.

According to one aspect of the present invention, an audience member ad serving functionality is provided. In certain embodiments, this functionality is provided in the context of an Ad Server, which is configured to provide the ad serving functionality.

Traditional ad serving may be contextual and/or reactive to the request to serve an ad. This can lead to undesirable results, and is certainly less than optimal, as the perceived context may not correlate to the particular audience member to be served the ad. By contrast, the audience member ad serving functionality incorporates a recognition of the audience member to whom an advertisement will be directed. It also uses a previously established set of profile data corresponding to the particular audience member in optimizing the selection of advertisements for the audience member. In this fashion, the audience member ad serving functionality may provide advertisements most appropriate to a particular audience member. Although the system is individualized in function, it preferably retains the anonymity of the audience member.

The determination of an advertisement is based, at least in part, upon profile data corresponding to an audience member. This profile data may be collected and managed in segments as previously described, and may further implement an audience matching network comprising several audience member information collection domains as previously described. Although these are useful techniques for establishing the profile data, it should be recognized that alternative techniques for collecting and managing profile data may also be used.

Although the serving of advertisements in the context of displaying web pages is described, it should also be understood that the advertisements may be provided in other systems, including but not limited to cable and satellite television and video delivery systems.

Figure 17:
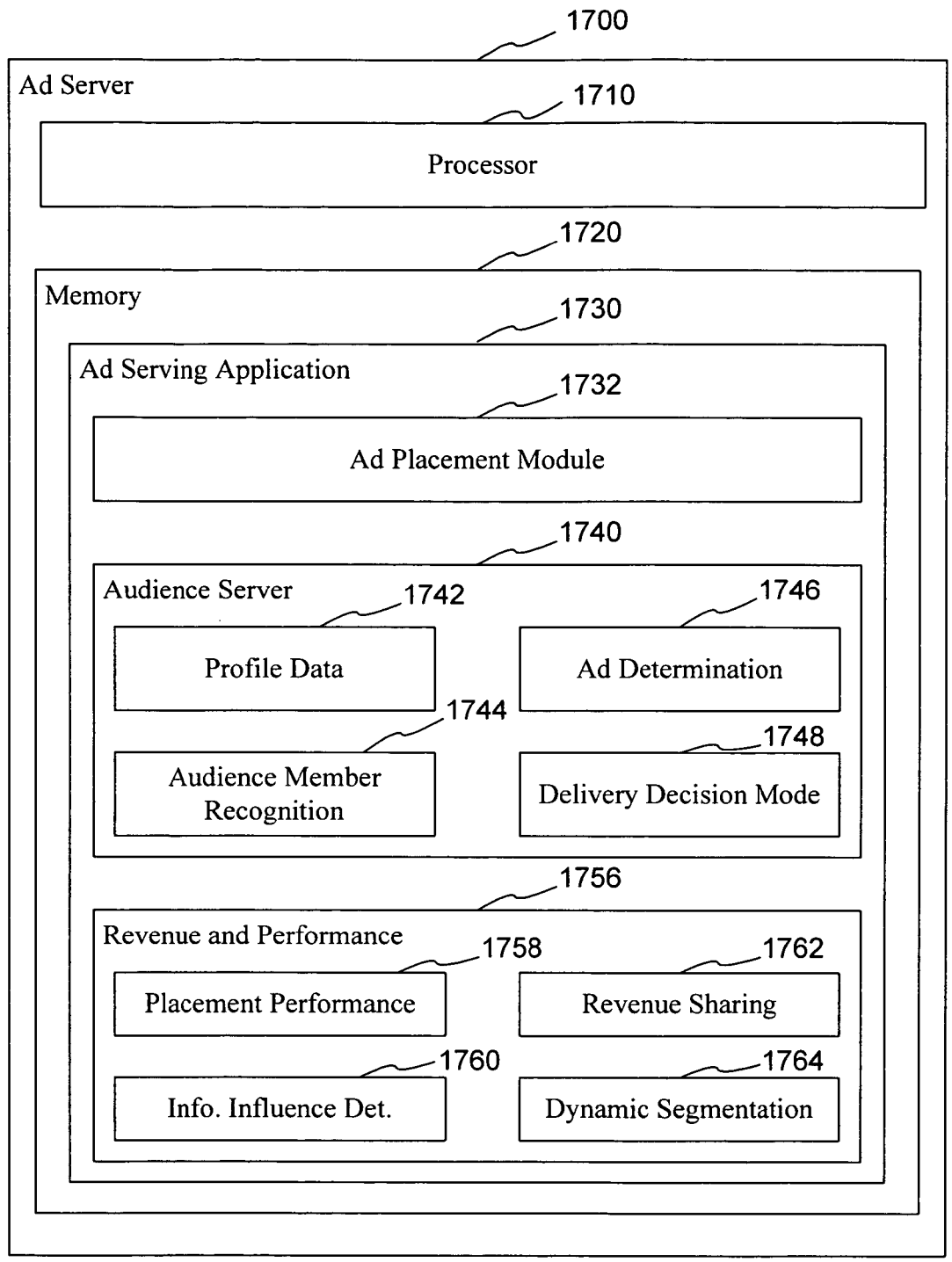
FIG. 17 is a block diagram illustrating an example of an ad server configured to include audience member ad serving in accordance with the present invention.

FIG. 17 is a block diagram illustrating an example of an ad server 1700 configured to include audience member ad serving in accordance with the present invention. The ad server 1700 may use any of various hardware based systems and is illustrated to include a processor 1710 and memory 1720, with the memory further comprising an ad serving application 1730.

The ad serving application 1730 is preferably software, but may alternatively include hardware and firmware or any combination of software, hardware and/or firmware. Although one modular breakdown is shown for the ad serving application 1730, it is understood that the functionality may also be provided by greater, fewer, or differently named modules.

The ad serving application 1730 includes an ad placement module 1732, an audience member serving module 1740, and a revenue and performance module 1756. The ad placement module 1732 provides the basic capability for accommodating the placement of content, preferably advertisements. This entails receiving a request to serve an advertisement and fulfilling the request by determining the advertisement to be placed in association with the request.

The mechanics of receiving requests for advertisements and serving advertisements are well known, and need not be described in detail herein. Typically the request to serve the advertisement will involve an audience member requesting a page, whereupon the audience member's browser is redirected to the Ad Server 1700 to request one or more advertisements for placement on the page. The request may also be configured to include an identifier corresponding to the audience member, such as the previously described PRID or NPRID. The request may further include additional information corresponding to the request, such as information that identifies the audience member as belonging to a particular segment, also as previously described.

The serving of advertisements may also be provided in connection with a bidding process, as described further in pending application Ser. No. 10/981,733, entitled "Audience Matching Network with Performance Factoring and Revenue Allocation." The bid process accommodates the bidding on network segments by advertisers. Advertisers bid on available segments, to help ensure that their advertisements target audience members corresponding to a desired segment. Where this feature is provided, the Ad Server 1700 may be prompted to select an ad with the highest bid for a segment that has not already met its performance goals, has not exceeded its run dates and is not excluded by a publisher exclusion rule. An audience member may be part of more than one segment, so this process occurs across multiple segment targets.

The bidding process may also result in a ranking of advertisements. Pages often include multiple locations for advertisements, and both the ranking of advertisements for a given segment and the membership in more than one segment may contribute to which advertisements are placed on a page. The algorithm for placing advertisements may be variously altered as desired. For example, a randomized entry of non-highest bid advertisements may be used to allow them to be placed, which may result in determining that such an advertisement is a leading performer in a given segment. Where bidding and ranking are used, such factors may be incorporated into the selection of advertisements to be served to an audience member.

The audience member ad serving module 1740 includes a profile data module 1742, and audience member recognition module 1744, an ad determination module 1746, and a delivery decision mode module 1748.

The profile data module 1742 maintains profile data corresponding to numerous audience members. The profile data may be organized in any fashion, including but not limited to the described audience segments, wherein audience members are determined to have membership in segments that are variously defined. Although the profile data module 1742 is shown to reside in the Ad Server 1700, the Ad Server 1700 does not necessarily collect and organize the profile data information. Rather, the information may be collected in an information collection domain, or a network or such domains, and the gathered profile data may simply be provided to the Ad Server 1700 to populate the profile data module 1742. Where a segment based system is used, this information may be a listing of segments and an associated listing of audience members the comprise each segment's membership list. Alternatively, the profile data may comprise a database having a record for each audience member, with each record providing a listing of behavioral and characteristics information for the relevant audience member.

The audience member recognition module 1744 recognizes audience members associated with requests to serve advertisements. The module 1744 is in communication with the profile data module 1742, which accommodates the correlation of each particular audience member to profile data. Preferably, this process is undertaken in a fashion that retains the anonymity of the audience member. This may be accommodated by using a unique identifier that is associated to each audience member that is managed by the system (e.g., NPRID, PRID). The ad placement module 1732 may receive the unique identifier with the request, such as within the URL redirecting the audience member's browser to the Ad Server 1700. The audience member recognition module 1744 receives this information and uses it to identify the audience member in connection with whom the request to place the advertisement is made. The identification of the audience member allows a communication with the ad determination module 1746 that accommodates the placement of advertisements optimized for the particular audience member.

The ad determination module 1746 engages in an ongoing determination of the best advertisements to serve to particular users, preferably down to an individualized basis. These determinations are made separately from requests to serve advertisements and are thus not merely reactive to such requests as is typically the case with conventional ad delivery systems. Prior to receipt of the request by the Ad Server 1700, the ad determination module 1746 will have established an optimized set of advertisements to be delivered to any audience member for whom profile data had been collected. Thus, for a given audience member, a personalized and optimized set of advertisements is established based upon their existing profile data. Again, this profile data is preferably organized in a fashion that protects the anonymity of the individual, such as using an identifier. In this fashion, the profile data module 1742, audience member recognition module 1744, and ad determination module 1746 may each use the unique identifier scheme to commonly manage the information for individual audience members.

The ad determination module 1746, by predetermining the optimized set of advertisements in this fashion, accommodates the realization of several advantages. For one, more computational leeway is afforded to the determination of which advertisements are most suited to a particular user. Systems that receive a request and merely place an advertisement in response to the request are merely reactive, and allow only limited processing to determine the best advertisement to place. Such reactive systems are also typically more tightly connected to the context of the request (e.g., the content of the web page on which the advertisement will be placed). The ad serving application 1730 accommodates a thorough consideration of the best advertisements for an audience member. Additionally, although the context of the request may supplement the determination of the best advertisements, it is not the sole source of information for making the determination.

For example, the ad determination module 1746 may determine that a given audience member is in the market for a new automobile, based upon information in the profile data (e.g., it may show browsing activities known to be attributable to car purchasing). The ad determination module 1746 may further understand, based upon the profile data, that the individual has an affinity for a given Brand X, or a disinclination to purchase another brand, based upon other profile data. Any of various behavioral and characteristics information, whether online or offline originated, as described above, may comprise the profile data from which the determination is made. Even if a request is made in connection with a page whose context would not suggest the purchasing of an automobile (e.g., requesting a weather page), the ad determination module 1746 may nevertheless have previously queued an advertisement for Auto Brand X. In this fashion, the Auto Brand X advertisement may be placed in the weather page (via the placement module 1732).

Of course, as is well known, several advertisements may occupy a given page. The ad determination module 1746 may prompt the placement of multiple advertisements for any audience member, and may also rank the advertisements based upon the optimized listing, such that favored positions are filled by advertisements based upon relative rankings.

In addition to determining the optimized listing, the audience member ad serving module 1740 may accommodate configurable modes of operation. The delivery decision mode module 1748 accommodates the presentation of interfaces and corresponding receipt of administrator input to configure delivery modes. In one embodiment, this may be a discrete selection of "pre-optimized factoring" versus "delivery time factoring". The former will rely only upon the previously established optimized listing of advertisements in determining which ads to place in connection with a request. In other words, the previously accumulated profile data and corresponding determinations. The latter will also account for information received in conjunction with the request, which may even include contextual information. The user may also select both such that the pre-optimized and delivery time factoring are used. The user/administrator merely selects the mode(s) and confirms selection to activate the desired mode.

In addition to a discrete selection, a sliding scale interface and corresponding selection may be implemented, with one pole being entirely pre-optimized factoring and the other being delivery time factoring.

The placement of advertisements for audience members by the ad serving application 1730 also accommodates accumulating knowledge about audience members. That is, the above described process is used to determine optimized listings and thereby serve advertisements appropriate to individual audience members. There may or may not be a response to that advertisement, but regardless, the profile data continues to be supplemented for individual audience members. Thus, the system accommodates additional learning about audience members, which further improves the advertisement decisions for subsequent requests.

Revenue and performance criteria may also be used in conjunction with the determination of the advertisement to be served to an audience member. This may involve an initial determination of an optimized set of advertisements for a particular audience member, followed by application of revenue and performance criteria to either select from the optimized listing and/or adjust a ranking of the optimized listing. Alternatively, the revenue and performance criteria may be integrated with the determination of the optimized listing in the first instance.

The revenue and performance module 1756 includes a placement performance module 1758, an information influence determination (IID) module 1760, a revenue sharing module 1762, and a dynamic segmentation module 1764.

Generally, the revenue and performance module 1756 accommodates the incorporation of revenue and performance issues into the determination of which advertisements should be placed for any given audience member. In one embodiment, the performance criteria are configured to benefit the publisher corresponding to the placement of the advertisement. Finally, revenue may also be allocated corresponding to the delivery of the advertisement based upon participation as a data provider in the collection of information.

The placement performance module 1758 generally determines which advertisements to deliver, based upon various criteria but preferably making publisher (web site) revenue paramount in placement determinations. The revenue sharing module 1764 allocates the sharing of revenue related to ad placement and related activities according to the role that a party provides. The information influence determination module 1760 works in conjunction with the revenue sharing module 1762 and helps in the allocation of revenue by establishing the influence that various different pieces of information is deemed to have, particularly with regard to how recent such information was collected. In embodiments that use the above described segment based approach, the dynamic segmentation module 1764 accommodates the creation of segments to maximize the revenue and yield from advertisements placed in connection with such segments.

Two examples of maximizing revenue to a publisher include 1) choosing, from among the pool of possible ads, those ads for which the publisher is paid the most money (impression model) and 2) increasing the likelihood of generating a click-through for any given ad by providing additional behavioral targeting criteria not currently available to the 3rd party networks.

In the first example, the publisher provides the system with its impression goals and the CPM (cost per thousand) for each of the potential ad deliveries/networks. The placement performance module 1758 then uses this information to direct the Ad Server 1700 to choose, based upon current delivery metrics (e.g., number of impressions previously delivered against a given campaign, CPM), the advertisement that will provide the most revenue to the publisher. This arrangement improves on the approach of simply serving the ad with the highest CPM in every instance, as each campaign has a maximum impression goal beyond which the advertiser or network will not pay for impressions.

In the second example, the Ad Server 1700 has available the segment affiliation of the visitor and can choose, based upon the target criteria of the campaigns, the ads most likely to generate a click from the visitor, thereby maximizing the revenue for the so called pay-per-click campaigns. Click likelihood in this case may be determined in a number of ways. One example is to evaluate the click history of the audience member and see what ads s/he has clicked on in the past. Another example would be to look at the ads that have the highest click rate with respect to the target segment or other segments. There may also be a feedback loop, of clicks/per impression/price per click to determine the value of an ad, in lieu of purely determining the ads most likely to be clicked.

These are just two examples of optimization that may be performed by the AMN System through the placement performance module 1758. Publishers and advertisers may provide various types of information for application to ad delivery opportunities as desired.

The IID module 1760 determines the influence that information has on an audience member's behavior. According to this aspect of the present invention, not all data is presumed to have equal value in influencing the behavior of an audience member. For example, some data may be more valuable in influencing behavior of one type (e.g., auto purchase) while other data is more valuable for other types of behavior (e.g., traveler). The IID module 1760 evaluates the relative impact that different pieces of data have upon the effectiveness of a particular segment. These effectiveness metrics can then be used for determining the priority of an ad to be served to an audience member (i.e. to maximize the revenue by serving the ads most likely to be clicked on by the audience member) and for the determination of distribution of revenue to data providers as described with regard to the Revenue Sharing module 1762, below.

Various factors may go into determining the impact that individual data points have on the overall effectiveness of a segment, and may be configured as desired by the system designer. Examples of factors include recency, frequency, correlation analysis across segments with similar data values, data half-life analysis (described below), primacy (first site to provide data value), and intensity (which is similar to frequency but is measured as frequency per unit time).

The data half-life analysis refers to a process whereby an analysis is done of the overall effectiveness of data values over time to determine at what point a data value's effectiveness has been reduced by half. For example, it is well known that car buying behavior is relevant for less than 90 days as a consumer researches and then either purchases or abandons the purchase process. In one embodiment, this is determined statistically by looking at the click-through rates on ads targeted at segments including particular data values and correlating this information with the age of the data provided. This is used to generate a curve where the effectiveness declines over time. This half-life analysis is then used to influence the value of a particular data value when evaluating a segment that contains that data value.

In addition, data provider metrics may also influence the value that a particular data point has in the overall effectiveness evaluation. For example, cars.com or Edmunds might be considered a more reliable indicator of auto buyer interest than similar content at USAToday.com or the Dallas Morning News website.

Finally, a further improvement on equal weighting of all data values is considering the value of the audience that is a part of a given segment in determining the effectiveness of the data in a segment. This is provided by analyzing behavior by a segment. If the audience included has a high proportion of audience members that have shown a willingness to click on ads, this information can be used to further enhance the effectiveness profile of the segment. Other metrics in this category include analysis of the average number of segments that the audience members in a given segment are a part of. This could show a more valuable audience because the diversity of data about this audience, leading to more "touch points" and hence, opportunities to present relevant advertisements.

The Revenue Sharing module 1762 accommodates allocation of revenue among relevant participants in the delivery of advertisements. Generally, the Revenue Sharing module 1762 builds upon standard practices in the industry where by two or more partners agree to split the revenue generated by an ad placement.

In one case, this involves inclusion of the publisher that provides the data about a targeted audience member and may thereby be referenced as a "data provider" in the revenue sharing arrangement. The data provider is compensated based upon the fraction of the data used in the targeted delivery provided by the data provider. For example, if an audience member is classified into the network segment "Business Travelers", and the data is provided in line with the example described above, then a.com and b.com would split the data provider revenue when a Business Traveler clicks on an ad, since they each contributed ½ the data involved in the segment that resulted in a click. In addition, the audience provider (publisher partner that served the ad that was clicked on) will also receive a percentage of the revenue.

The Revenue Sharing module 1762 also applies data value and audience value metrics, as described regarding the IID module 1760, to the revenue sharing arrangement. This accommodates rewarding the data providers that contribute the audience member or data value that had more impact on the successful conversion of the audience member (that is to say, the click event) with a higher percentage of the data provider portion of the revenue.

Finally, the Revenue Sharing module 1762 may also determine data provider value metrics in line with the information provided by the IID module 1760. In this scenario, the brand or nature of a data provider's site will result in a higher or lower apportionment of the data provider revenue share based upon the value of the brands market awareness or authority of the data providers content.

The dynamic segmentation module 1764 is optional, and preferably will be implemented in embodiments that use the above-described segment based approach. The dynamic segmentation module 1764 generates segments based upon a correlation analysis. This may informally be referred to as a "people like this" approach. This allows an advertiser to identify a desired action or series of actions and tag the pages (on their site or others) that represent the desired action (purchase, visit of a promotional site, etc). Based upon the historical behavior of the visitors that take the desired action, the dynamic segmentation module 1764 correlates the profiles of visitors that have the desired behavior with all other profiles to find those visitors that have not taken the desired action but show a close affinity to those profiles that have taken the desired action. Consequently, the Ad Server 1700 may be instructed to target a promotional advertisement to those visitors that have not yet taken the action, with a high degree of likelihood that these users will also take the desired action.

Regardless of which of the above described revenue and performance features are used, a feedback of information based upon performance may be used to enhance the profile data that is used to optimize advertisement selection for particular audience members. This may be particularly useful with regard to the correlation analysis described in the preceding paragraph. An initial pass may update the profile data for multiple audience members who satisfy the "people like this" criteria. Following determinations may be used to refine the group as more is learned about which audience member types perform the desired action.

Figure 18:
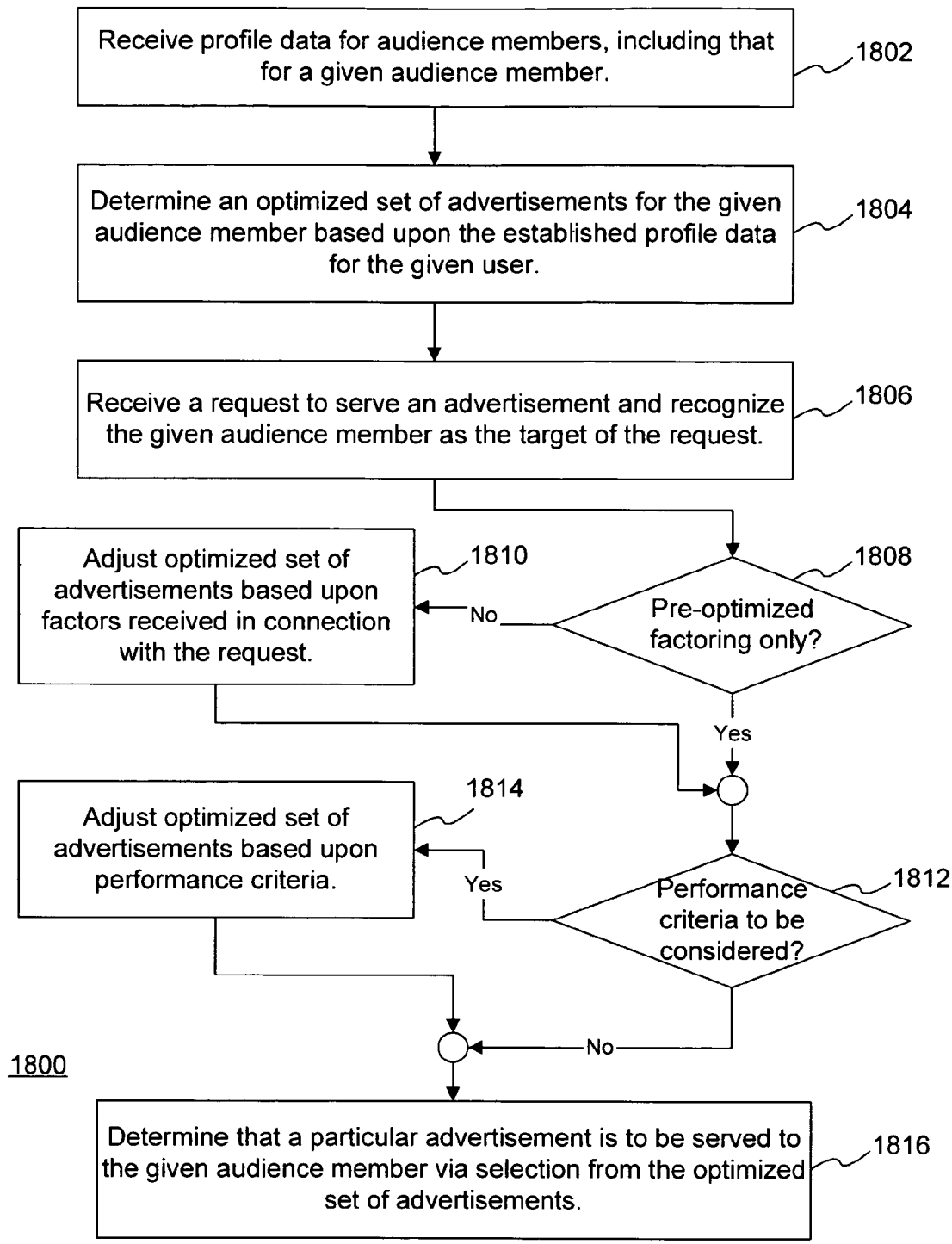
FIG. 18 is a flow chart illustrating an example of an audience member ad serving method in accordance with the present invention.

FIG. 18 is a flow chart illustrating an example of an audience member ad serving method 1800 in accordance with the present invention, as described in further detail in connection with FIG. 17.

The method 1800 entails receipt 1802 of profile data for audience members who may potentially be served ads by the Ad Server. Profile data for numerous audience members is retained, with organization as described, such that a given audience member has a corresponding established set of profile data. In connection with any audience member, an optimized set of advertisements is selected based upon their established profile data. Thus, continuing with the example, the system will have an established profile data particular to the given audience member.

A request to serve an advertisement is received 1806 by the Ad Server. As described farther above, this may be prompted by a request for a web page by the audience member, followed by a redirection of the audience member's browser to the Ad Server with a request for one or more advertisements that will populate locations on the requested web page. The audience member is uniquely recognized by the Ad Server, such as through an identifier that is in some way associated to the request (e.g., within the redirect URL).

Identification of the given audience member allows retrieval of the optimized set of advertisement for that user. In conjunction with this, a determination 1808 is made as to whether solely pre-optimized factoring, or additional factors such as those received in connection with the request will be used to select the advertisement to be served to the audience member. If the latter, the optimized set of advertisements is adjusted 1810 based upon such factors. Another determination 1812 considers whether performance and revenue criteria will be considered in the selection of advertisements. Again, if such is the case, the optimized set of advertisements is adjusted 1814 accordingly. The performance and revenue criteria and corresponding adjustments may be variously provided, such as described in detail in connection with FIG. 17.

Once these considerations are made and implemented as necessary, the particular advertisement to be served to the given audience member is determined 1816 via selection from the optimized set. The advertisement is placed in the requested web page in conventional fashion.

Thus embodiments of the present invention provide the delivery of content to an audience member and related aspects. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A computer implemented method for delivering content in an HTTP client-server computer system over a computer network, the method comprising:

receiving profile data regarding each of a plurality of client computers, the profile data including an established profile data for a given client computer from the plurality of client computers;

receiving a request to serve an advertisement to a given client computer;

recognizing the given client computer as the target of the request;

determining a particular advertisement is to be served to the given client computer based upon recognizing the given client computer and a selection from a set of advertisements that is optimized for the given client computer, the optimized set of advertisements being based upon the established profile data for the given client computer;

delivering the particular advertisement to the given client computer by way of display on a device connected to the computer network; and allocating revenue corresponding to delivery of the particular advertisement based upon participation as a data provider in the collection of information used to generate the established profile data for the given client computer, wherein the allocation of revenue is based on relative profile data values.

2. The method of claim 1, wherein the established profile data is received separately from and prior to receiving the request to serve the advertisement.

3. The method of claim 1, wherein recognizing the given client computer implements an anonymous unique identifier corresponding to the given client computer.

4. The method of claim 1, wherein determining the particular advertisement implements a configurable delivery decision making mode.

5. The method of claim 4, wherein the configurable delivery decision making mode includes a pre-optimized factoring option that prompts determining the particular advertisement depending upon the established profile data, separately from the context of the request.

6. The method of claim 5, wherein the configurable delivery decision making mode includes a delivery time factoring option that supplements determining the particular advertisement with consideration of the context of the request.

7. The method of claim 1, wherein determining the particular advertisement is also based upon performance criteria configured to benefit a publisher of content in which the advertisement is placed.

8. The method of claim 7, wherein the performance criteria includes maximizing revenue to the publisher.

9. The method of claim 8, wherein determining the particular advertisement includes selecting an advertisement with the highest available payment to the publisher.

10. The method of claim 1, further comprising:

receiving from a publisher a set of delivery criteria corresponding to potentially deliverable advertisements, wherein determining the particular advertisement comprises selecting an advertisement with the highest available payment to the publisher based upon a comparison of current delivery metrics to the set of delivery criteria.

11. The method of claim 1, wherein a separate accounting is made for a first data provider that provides a first attribute for the given client computer in a first information collection domain, and for a second data provider that provides a second attribute for the given client computer in a second information collection domain.

12. The method of claim 1 wherein the relative profile data values are based at least in part on the age of the profile data.

13. The method of claim 12 wherein the relative profile data values are based at least in part on the identity of the profile data provider.

14. The method of claim 13 wherein the relative profile data values are based at least in part on identification of a segment client computers with which the client computer is affiliated, which segment defines the client computers to which the advertisement is targeted.

15. The method of claim 1 wherein the relative profile data values are based at least in part on the identity of the profile data provider.

16. The method of claim 1 wherein the relative profile data values are based at least in part on identification of a segment client computers with which the client computer is affiliated, which segment defines the client computers to which the advertisement is targeted.

* * * * *